United States Patent
Hedayat et al.

(10) Patent No.: US 10,505,595 B2
(45) Date of Patent: Dec. 10, 2019

(54) MIXED FINE/COARSE SOUNDING METHODS FOR HE STAS FOR MIMO AND OFDMA

(71) Applicant: NEWRACOM, Inc., Lake Forest, CA (US)

(72) Inventors: Ahmad Reza Hedayat, Aliso Viejo, CA (US); Young Hoon Kwon, Laguna Niguel, CA (US)

(73) Assignee: NEWRACOM, INC., Lake Forest, CA (US)

( * ) Notice: Subject to any disclaimer, the term of this patent is extended or adjusted under 35 U.S.C. 154(b) by 441 days.

(21) Appl. No.: 15/056,953

(22) Filed: Feb. 29, 2016

(65) Prior Publication Data

US 2016/0254884 A1     Sep. 1, 2016

Related U.S. Application Data

(60) Provisional application No. 62/205,628, filed on Aug. 14, 2015, provisional application No. 62/121,789, filed on Feb. 27, 2015.

(51) Int. Cl.

| | |
|---|---|
| *H04L 5/00* | (2006.01) |
| *H04W 72/04* | (2009.01) |
| *H04B 7/04* | (2017.01) |
| *H04B 7/0413* | (2017.01) |
| *H04B 7/0456* | (2017.01) |

(Continued)

(52) U.S. Cl.
CPC ......... *H04B 7/0413* (2013.01); *H04B 7/0456* (2013.01); *H04B 7/063* (2013.01); *H04B 7/0628* (2013.01); *H04B 7/0695* (2013.01); *H04B 7/0452* (2013.01); *H04L 5/0048* (2013.01); *H04W 84/12* (2013.01)

(58) Field of Classification Search
CPC ... H04W 28/04; H04W 72/04; H04W 72/042; H04W 88/08; H04W 5/0007
USPC .......................................................... 370/329
See application file for complete search history.

(56) References Cited

U.S. PATENT DOCUMENTS

| | | | |
|---|---|---|---|
| 8,102,944 B2 * | 1/2012 | Wallace ................. | H04B 7/043 375/316 |
| 8,520,576 B2 * | 8/2013 | Kim ..................... | H04B 7/0452 370/310 |

(Continued)

OTHER PUBLICATIONS

IEEE P802.11ah/D5.0: "Part 11: Wireless LAN Medium Access Control (MAC) and Physical Layer (PHY) Specifications, Amendment 2: Sub 1 GHz License Exempt Operation," IEEE Draft Standard for Information technology—Telecommunications and information exchange between systems, Local and metropolitan area networks—Specific requirements, Mar. 2015, 632 pages.

(Continued)

*Primary Examiner* — Gbemileke J Onamuti
*Assistant Examiner* — Sanjay K Dewan
(74) *Attorney, Agent, or Firm* — NDWE LLP

(57) ABSTRACT

An enhanced sounding procedure provides both fine and coarse feedback from beamformees within the same sounding interval. This enhanced sounding procedure is enabled by several new fields in the sounding procedure field. The enhanced sounding procedures include multiple embodiments that can perform sounding between a beamformer and multiple high efficiency (HE) and/or very high throughput (VHT) beamformees each supporting coarse or fine sounding as the beamformer indicates.

19 Claims, 12 Drawing Sheets

(51) Int. Cl.
*H04B 7/06* (2006.01)
*H04W 84/12* (2009.01)
*H04B 7/0452* (2017.01)

(56) References Cited

U.S. PATENT DOCUMENTS

| | | | | |
|---|---|---|---|---|
| 8,630,673 B2* | 1/2014 | Chakraborty | .......... | H04L 5/0007 |
| | | | | 375/260 |
| 8,644,765 B1* | 2/2014 | Zhang | .................. | H04B 7/0417 |
| | | | | 370/249 |
| 8,665,803 B2* | 3/2014 | Sampath | ............... | H04L 5/0007 |
| | | | | 370/329 |
| 8,908,600 B2* | 12/2014 | Sampath | ............... | H04B 7/0632 |
| | | | | 370/236 |
| 9,059,821 B2* | 6/2015 | Shapira | ................. | H04L 1/0027 |
| 9,585,043 B2* | 2/2017 | Grandhi | ................. | H04W 4/06 |
| 9,680,538 B2* | 6/2017 | Xia | ....................... | H04B 7/0617 |
| 2005/0249159 A1* | 11/2005 | Abraham | ............ | H04B 7/0421 |
| | | | | 370/329 |
| 2007/0230373 A1* | 10/2007 | Li | ........................ | H04B 7/0447 |
| | | | | 370/267 |
| 2007/0298742 A1* | 12/2007 | Ketchum | ............. | H04B 7/0617 |
| | | | | 455/186.1 |
| 2008/0165875 A1* | 7/2008 | Mundarath | .......... | H04B 7/0417 |
| | | | | 375/262 |
| 2012/0033592 A1* | 2/2012 | Kim | ..................... | H04B 7/0452 |
| | | | | 370/310 |
| 2013/0034003 A1* | 2/2013 | Shapira | ................. | H04L 1/0026 |
| | | | | 370/252 |
| 2013/0301551 A1* | 11/2013 | Ghosh | ................. | H04W 72/042 |
| | | | | 370/329 |
| 2013/0336215 A1* | 12/2013 | Kim | ..................... | H04B 7/0452 |
| | | | | 370/328 |
| 2014/0154992 A1* | 6/2014 | Silverman | ............. | H04W 16/28 |
| | | | | 455/63.4 |
| 2014/0301240 A1* | 10/2014 | Park | ..................... | H04B 7/0643 |
| | | | | 370/253 |
| 2015/0029986 A1* | 1/2015 | Seok | .................... | H04B 7/0632 |
| | | | | 370/329 |
| 2015/0319747 A1* | 11/2015 | Chu | .................. | H04W 72/0406 |
| | | | | 370/330 |
| 2016/0134342 A1* | 5/2016 | Kneckt | ................ | H04B 7/0452 |
| | | | | 375/267 |
| 2016/0197655 A1* | 7/2016 | Lee | ........................ | H04B 7/024 |
| | | | | 370/338 |
| 2017/0054542 A1* | 2/2017 | Vermani | ............. | H04L 5/0057 |
| 2017/0063437 A1* | 3/2017 | Elsherif | ................. | H04L 5/006 |
| 2017/0063438 A1* | 3/2017 | Baik | ..................... | H04B 7/0456 |
| 2017/0070274 A1* | 3/2017 | Lim | ..................... | H04B 7/0617 |

OTHER PUBLICATIONS

IEEE Std 802.11-2012: "Part 11: Wireless LAN Medium Access Control (MAC) and Physical Layer (PHY) Specifications," IEEE Standard for Information technology—Telecommunications and information exchange between systems, Local and metropolitan area networks—Specific requirements, Mar. 29, 2012, 2793 pages.
IEEE Std 802.11ac-2013 "Part 11: Wireless LAN Medium Access Control (MAC) and Physical Layer (PHY) Specifications, Amendment 4: Enhancements for Very High Throughput for Operation in Bands below 6 GHz," IEEE Standard for Information technology—Telecommunications and information exchange between systems, Local and metropolitan area networks—Specific requirements, Dec. 18, 2013, 425 pages.

* cited by examiner

| Order | Information |
|---|---|
| 1 | Category |
| 2 | VHT Action |
| 3 | VHT MIMO Control |
| 4 | VHT Compressed Beamforming Report |
| 5 | MU Exclusive Beamforming Report |

| B0 B2 | B3 B5 | B6 B7 | B8 B9 | B10 | B11 | B12 B14 | B15 | B16 B17 | B18 B23 |
|---|---|---|---|---|---|---|---|---|---|
| Nc Index | Nr Index | Channel Width | Grouping | Codebook Information | Feedback Type | Remaining Feedback Segments | First Feedback Segment | Reserved | Sounding Dialog Token Number |
| Bits: 3 | 3 | 2 | 2 | 1 | 1 | 3 | 1 | 2 | 6 |

| Field | Description |
|---|---|
| L-STF | Non-HT Short Training field |
| L-LTF | Non-HT Long Training field |
| L-SIG | Non-HT SIGNAL field |
| VHT-SIG-A | VHT Signal A field |
| VHT-STF | VHT Short Training field |
| VHT-LTF | VHT Long Training field |
| VHT-SIG-B | VHT Signal B field |
| Data | The Data field carries the PSDU(s) |

MIXED FINE/COARSE SOUNDING METHODS FOR HE STAS FOR MIMO AND OFDMA

CROSS-REFERENCE TO RELATED APPLICATIONS

This application claims the benefit of U.S. Provisional Application No. 62/121,789, filed Feb. 27, 2015, and U.S. Provisional Application No. 62/205,628, filed Aug. 14, 2015, which are hereby incorporated by reference.

FIELD OF INVENTION

The embodiments of the invention are related to the field of wireless local area network (WLAN) operation. More specifically, the embodiments of the invention relate to a method and system for improving the efficiency of feedback in a sounding procedure. Other embodiments are also disclosed.

BACKGROUND

Institute of Electrical and Electronics Engineers (IEEE) 802.11 is a set of physical and media access control (MAC) specifications for implementing wireless local area network (WLAN) communications. These specifications provide the basis for wireless network products using the Wi-Fi brand managed and defined by the Wi-Fi Alliance. The specifications define the use of the 2.400-2.500 GHz as well as the 4.915-5.825 GHz bands. These spectrum bands are commonly referred to as the 2.4 GHz and 5 GHz bands. Each spectrum is subdivided into channels with a center frequency and bandwidth. The 2.4 GHz band is divided into 14 channels spaced 5 MHz apart, though some countries regulate the availability of these channels. The 5 GHz band is more heavily regulated than the 2.4 GHz band and the spacing of channels varies across the spectrum with a minimum of a 5 MHs spacing dependent on the regulations of the respective country or territory.

IEEE 802.11 defines a data frame exchange process that enables the devices, referred to as stations and access points, to negotiate the timing of the exchange of data between devices over the various shared channels of the 2.4 GHz and 5 GHz bands. As used herein, an access point (AP) is a particular type of station; however, station (STA) is generally used to refer to non-AP stations for clarity. The data frame exchanges could be performed with a single-antenna transmission or a multiple-antenna transmission (also referred to as multiple-input multiple-output or MIMO). That is, each of the stations or access points in the WLAN may include and utilize a single antenna or multiple antennas. In the case of a multiple-antenna or MIMO transmission, multiple spatial streams (SS) are sent within the same frame from one station or access point, which usually is called a beamformer (BFer), to another station or access point, which is usually called a beamformee (BFee), and this type of transmission is called beamforming (BF), or MIMO. BF and MIMO transmissions are usually enhanced by some initial frame exchanges so that the BFer knows about the MIMO channel conditions. This initial exchange of frames before the actual data frame exchange is called a sounding procedure. The frames that might be used in a sounding procedure are the high throughput (HT) and very high throughput (VHT) null data packet (NDP) frames, VHT MIMO Compressed Beamforming Report frame, VHT NDP Announcement (NDPA) frame, and VHT Beamforming Report Poll frame. Each of these frames may have various fields and subfields such as: VHT MIMO Control, VHT Compressed Beamforming Report, MU Exclusive Beamforming Report, Sounding Dialog Token, STA Info, and similar fields that are utilized for exchanging information relevant to beamforming.

SUMMARY

The embodiments include a set of methods that provide an enhanced sounding procedure. The enhanced sounding procedure provides both fine and coarse feedback from beamformees within the same sounding interval. This enhanced sounding procedure is enabled by several new fields in the sounding procedure field. The enhanced sounding procedures include multiple embodiments that can perform sounding between a beamformer and multiple high efficiency (HE) and/or very high throughput (VHT) beamformees each supporting coarse or fine sounding as the beamformer indicates.

In one embodiment a method is implemented by a network device in a wireless local area network (WLAN). The method improves beamforming where a steering matrix or a compressed beamforming report is utilized by a beamformer using feedback from at least one beamformee. The steering matrix or compressed beamforming report determines a spatial path for transmission from the beamformer to a set of beamformees in the WLAN. The embodiments include generating a sounding frame to initiate or continue a sounding procedure, the sounding frame including a level of granularity of feedback for the set of beamformees to report, and sending the sounding frame to the set of beamformees. This process may be implemented by the beamformer.

In a further embodiment, another method is implemented by a network device in a wireless local area network (WLAN). This method complements the above method to improve beamforming where a steering matrix or compressed beamforming report is determined by a beamformer using feedback from at least one beamformee. The steering matrix or compressed beamforming report determines a spatial path for transmission from the beamformer to a set of beamformees in the WLAN. The method utilizes a level of granularity in reporting feedback between the beamformer and the beamformee for use in determining the steering matrix or compressed beamforming report. This method includes receiving a sounding frame to initiate a sounding procedure from a beamformer. The sounding frame includes a level of granularity for use by each beamformee in the set of beamformees when generating a response frame. The method accesses the level of granularity in the sounding frame, generates the response frame based on the level of granularity specified by the sounding frame, and transmits the response frame to the beamformer. This second process may be implemented by each of the set of beamformees.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this specification are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

DETAILED DESCRIPTION

Figure 1A:
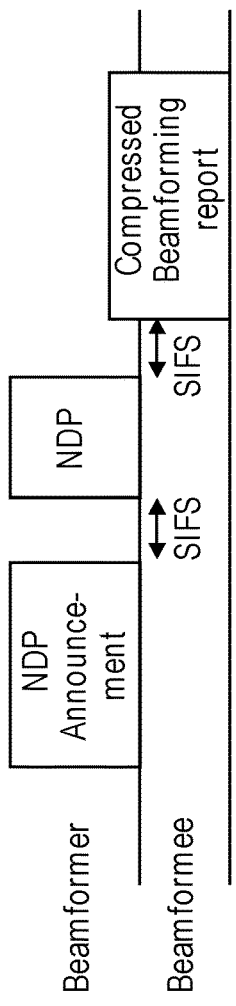
FIG. 1A is a timing diagram of one embodiment of a SU beamforming procedure.

The embodiments provide a method and system for an improved sounding procedure for stations in a wireless communication system such as a wireless local area network (WLAN) implementing a version of IEEE 802.11. The improvements to the sounding procedure relate to the efficiency of providing feedback during the sounding procedure. The embodiments provide improvements to the feedback in the sounding procedure by allowing both 'fine' and 'coarse' feedback from beamformees within the same sounding interval. This process is referred to herein as a high efficiency (HE) mixed sounding procedure. Processes are provided herein for implementation by the beamformer and the beamformee to enable this procedure. In addition, several new fields are introduced for use in the sounding procedure communications to enable this procedure. The proposed procedure in this disclosure in its multiple embodiments can perform sounding between an HE beamformer and multiple HE and/or very high throughput (VHT) beamformees each supporting coarse or fine sounding as the beamformer indicates.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

An electronic device stores and transmits (internally and/or with other electronic devices over a network) code (which is composed of software instructions and which is sometimes referred to as computer program code or a computer program) and/or data using machine-readable media (also called computer-readable media), such as non-transitory machine-readable media (e.g., machine-readable storage media such as magnetic disks, optical disks, read only memory, flash memory devices, phase change memory) and transitory machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more non-transitory machine-readable storage media (to store code for execution on the set of processors and data) and a set of one or more physical network interface(s) to establish network connections (to transmit code and/or data using propagating signals). Put another way, a typical electronic device includes memory comprising non-volatile memory (containing code regardless of whether the electronic device is on or off) and volatile memory (e.g., dynamic random access memory (DRAM), static random access memory (SRAM)), and while the electronic device is turned on that part of the code that is currently being executed is copied from the slower non-volatile memory into the volatile memory (often organized in a hierarchy) for execution by the processors of the electronic device.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Network devices or network elements can include stations and access points in wireless communications systems such as wireless local area network (WLAN). Stations (STAs) are devices connected to and communicating in a WLAN including client or user devices that connect to the WLAN via access points. Access points (APs) are network devices that may be specialized wireless access points that can communicate with other network devices in the WLAN via the wireless medium or via wired connections. APs may be considered to be a type of STA. However, or sake of clarity, as used herein, STAs refers to non-AP stations.

The embodiments relate to an enhanced sounding procedure. A sounding procedure is a process by which a set of beamformers and beamformees determine the channel conditions of the WLAN to optimize communication between these devices. In some embodiments, each beamformee participating in the sounding procedure may compute a steering matrix or compressed beamforming report that is utilized to configure transmissions between the beamformer and beamformees. In some embodiments, the beamformer (e.g., an AP) may be the primary drivers of the sounding procedure. APs or STAs that utilize a steering matrix or compressed beamforming report to transmit to another STA are referred to as 'beamformers' and the other STAs in the WLAN that respond to the sounding procedure and receive the transmissions of the beamformer according to its steering matrix or compressed beamforming report are referred to as the 'beamformees.' In the example where an AP is performing a sounding procedure with a plurality of STAs in a WLAN, the AP may be the beamformer and the communication with the STAs is a downlink (DL)-multi-user (MU)-multiple in multiple out (MIMO) communication. Transmit beamforming and DL-MU-MIMO require knowledge of the channel state to compute the steering matrix that is applied to the transmitted signal to optimize reception at one or more receiver STAs.

In some embodiments, the STA or AP transmitting using the steering matrix is called the beamformer and a STA for which reception is optimized is called a beamformee. An explicit feedback mechanism is used where the beamformee directly measures the channel from the training symbols transmitted by the beamformer and sends back a transformed estimate of the channel state to the beamformer. The beamformer then uses this estimate, perhaps combining estimates from multiple beamformees, to derive the steering matrix. The following figures shows some example embodiments of exchanges of sounding-related frames between one beamformer and one or several beamformees.

FIG. 1A is a diagram of one embodiment of a SU beamforming procedure. The sounding procedure where there is a single STA that is a beamformee is referred to as a single-user (SU) procedure. In this case, the beamformer sends a null data packet announcement (NDPA) followed by a short interframe space (SIFS). The NDPA serves to notify the STA that is to be the beamformee of the initiation and parameters of the sounding procedure. The beamformer then sends a null data packet (NDP). The format of this packet is described in further detail herein below, but it contains a set of symbols that are read by the beamformee to determine the conditions of the channel over which the NDP is sent. The beamformee then generates a beamforming report that includes the feedback, referred to as explicit feedback, for the beamformer. This beamforming report is then returned to the beamformer after a SIFS in a beamforming report message, such as a VHT compressed beamforming report.

Figure 1B:
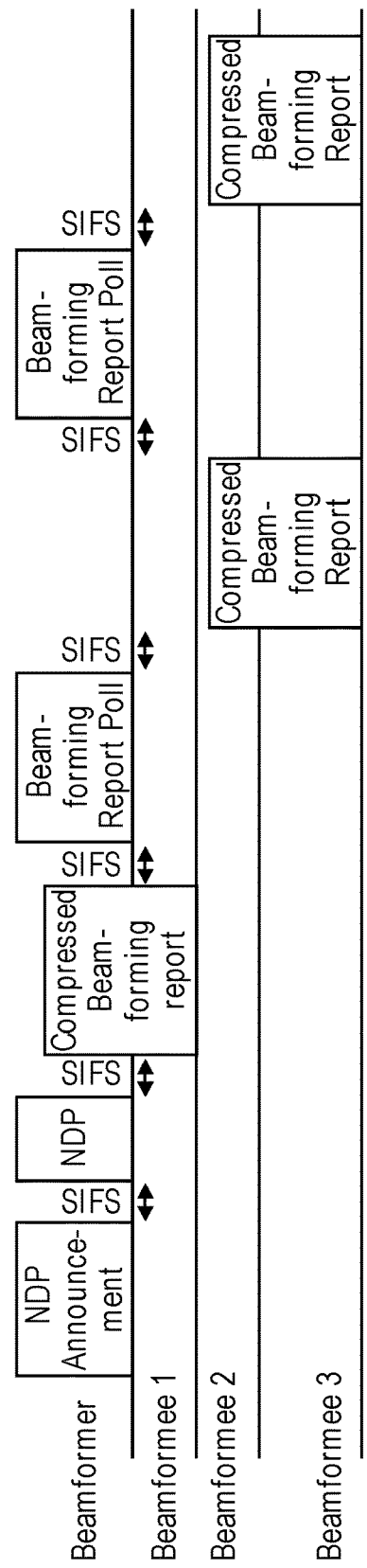
FIG. 1B is a timing diagram of one embodiment of a MU beamforming procedure.

FIG. 1B is a diagram of one embodiment of a MU beamforming procedure. In cases where there are multiple STAs in a WLAN that will participate as beamformees, the procedure is referred to as a multi-user (MU) beamforming procedure. In this case, the beamformer sends a NDPA followed by a SIFS. The NDPA is sent to all STAs in the WLAN for which the sounding procedure is performed. In some embodiments, the NDPA is sent to a limited number of STAs for which the beamforming/sounding procedure is to be carried out (e.g., four STAs) to ensure the responses of the beamformees are current. Thus, the beamformer may repeat the beamforming procedure over multiple subsets of the STAs in a WLAN to have a steering matrix or compressed beamforming report for each STA that is to be a beamformee. The NDPA serves to notify the STAs that are to be the beamformees of the initiation and parameters of the sounding procedure. The NDPA may include a station list that specifies the STA ID and order of the stations in the sounding procedure. The beamformer then sends a null data packet (NDP). The format of this packet is described in further detail herein below, but it contains a set of symbols that are read by the beamformee to determine the conditions of the channel over which the NDP is sent. Each of beamformees then generates a beamforming report that includes the feedback, referred to as explicit feedback, for the beamformer. This beamforming report is then returned to the beamformer after a SIFS in a beamforming report message, such as a VHT Compressed Beamforming Report. One STA at a time responds with the VHT Compressed Beamforming Report. After the first STA sends the VHT Compressed Beamforming Report followed by a SIFS, the beamformer sends a Beamforming Report Poll that requests the next STA to send a VHT Compressed Beamforming Report after a SIFS. This process continues until all of the STAs have responded.

Figure 2:
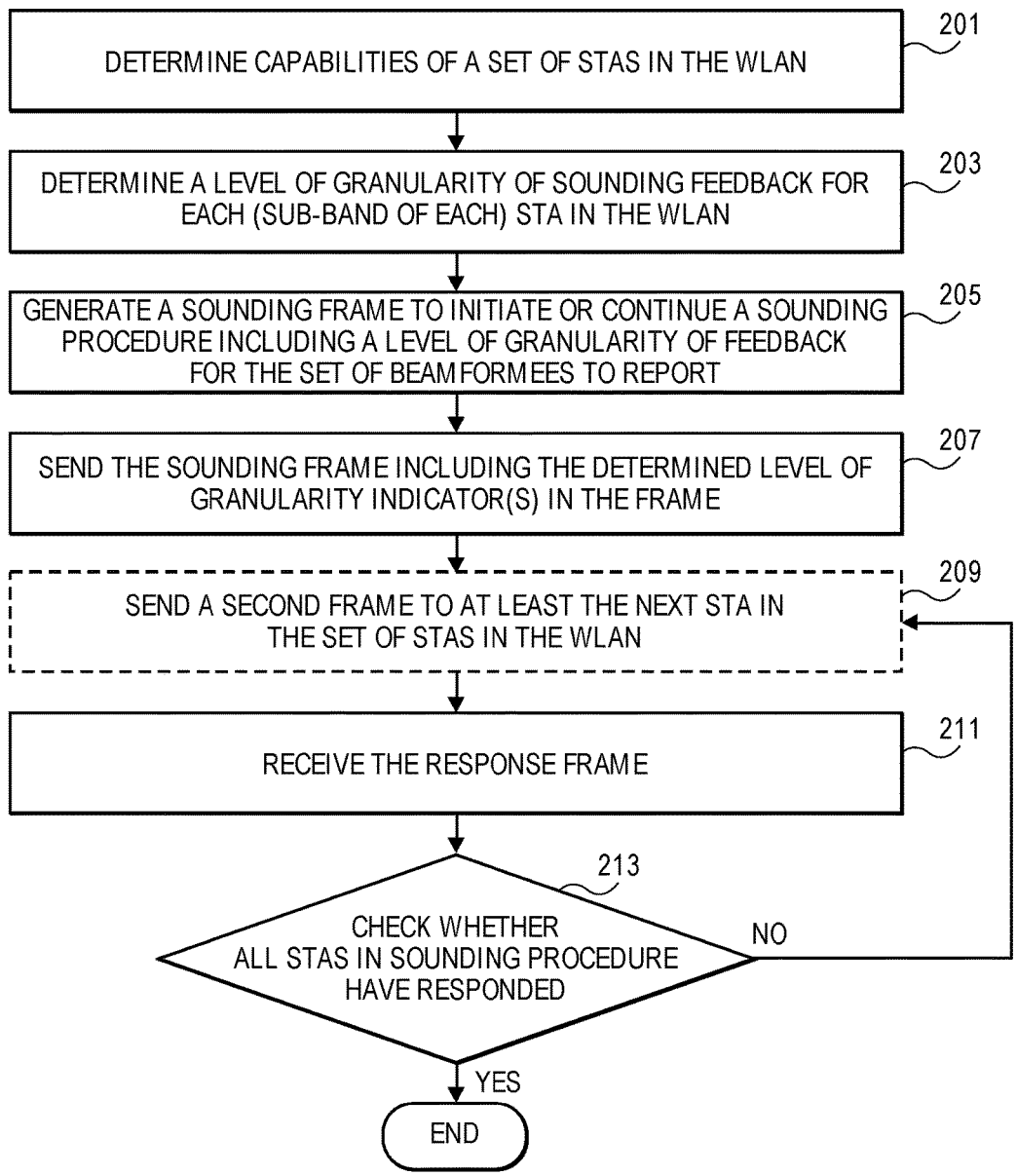
FIG. 2 is a flowchart of one embodiment of a process implemented by the beamformer for configuring granularity of the feedback to be provided by the beamformee.
Figure 3:
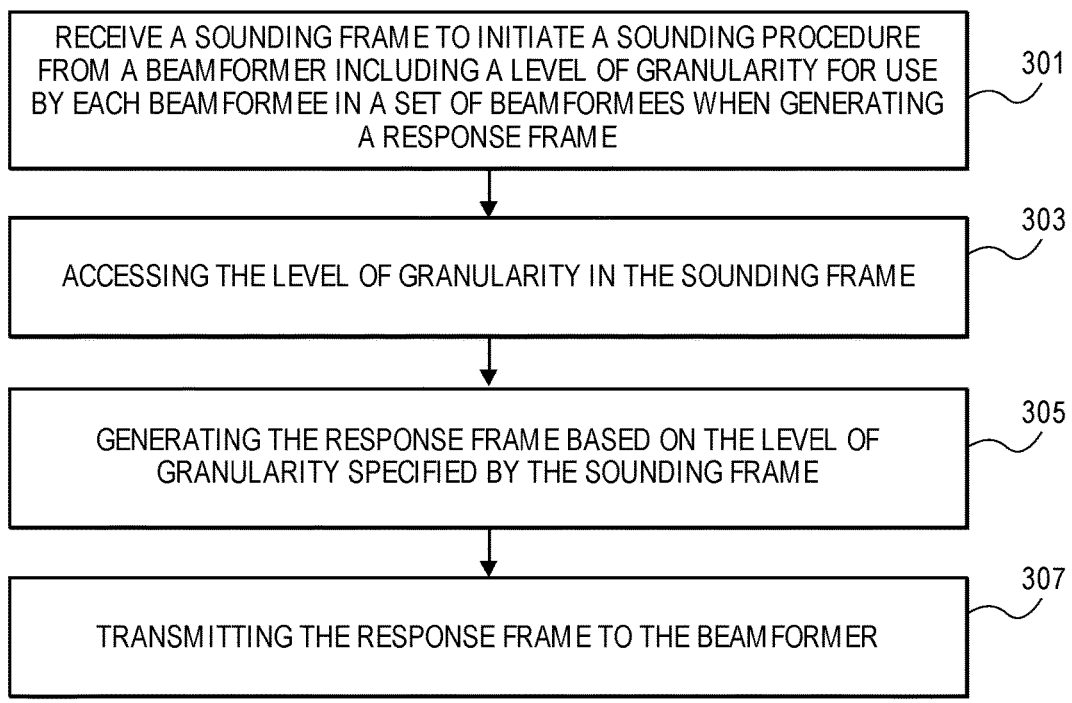
FIG. 3 is a flowchart of one embodiment of a process implemented by the beamformer for providing a granularity of feedback in a Beamforming Report requested by the beamformee.

Some embodiments described herein modify the operation of the beamforming procedure as shown in FIGS. 2 and 3. FIGS. 2 and 3 describe the processes implemented by the beamformer and beamformee that provide a method and system for improving the efficiency of the beamforming procedure by introducing support for communicating and configuring a degree of granularity in the feedback that is provided by the Beamforming Report. These processes are described at a high level. Specific example implementation details are discussed herein after.

FIG. 2 is a flowchart of one embodiment of a process implemented by the beamformer for configuring granularity of the feedback to be provided by the beamformee. In one embodiment, the process is implemented by the beamformer (e.g., an AP) that is utilizing a steering matrix or compressed beamforming report for SU or MU MIMO with each of a subset of the STAs in a WLAN. As mentioned above, the beamformer may repeat this process for multiple subsets of the STAs in the WLAN to obtain a steering matrix or compressed beamforming report of a desired set of the STAs, where the subset for a given execution of the sounding procedure may have limited size (e.g., four STAs). The process determines the capabilities of each STA in the subset of STAs in the WLAN or that are part of the sounding procedure (Block 201). This information can be conveyed in initial communications with each of these STAs and includes information about the identity and in some cases the capabilities for each of the STAs to communicate with regards to SU or MU MIMO and similar capabilities. The STAs can identify themselves via station identifiers, addresses or similar information. The information that is provided can include support for various types of feedback, in terms of granularity. The granularity in the feedback can vary based on the number of resource units (RUs) that the compressed feedback is to include. Each RU is a set of tones (e.g., 26, 52, 106 or similar set) and a field Ng can define the number of these tones for which a measured quality is to be reported back to the beamformer. Different sets of groups of these tones can be defined. For example, a fine level of feedback can encompass returning feedback on groups of 1, 2 or 4 tones (where Ng=1 indicates that characteristics for each tone are returned in a beamforming report, Ng=2 indicates that characteristics for every other tone or each set of tones are returned in a beamforming report, and Ng=4 indicates that characteristics for every fourth tone or each set of four tones are returned in a beamforming report). Whereas, a 'coarse' level of feedback can encompass returning feedback on groups of 4, 8, 16 or more tones, and in another case only one feedback (e.g. SNR/SINR and/or steering matrix) per whole RU is returned. The beamformer may further indicate that specific granularity levels for each RU. In contrast, in IEEE 802.11ac, the beamformee would decide Ng values for an entire channel and regardless of input from the beamformer. For example, the beamformee could select Ng=1 if every tone is to be reported back to the beamformer. In another example, the beamformee could select Ng=2, which would cause alternating tones or a single value for a set of tone to be reported back to the beamformer. In the embodiments, however, the beamformer sends an indicator of either a 'fine' or 'coarse' group of Ng values or sets of tone groupings to be utilized. The beamformee makes a selection of a value from the identified group. The beamformer may designate a group (i.e., fine or coarse) for each RU for a channel. Likewise a beamformee can select a different Ng value from the identified group (i.e., fine/coarse) for each RU.

In some embodiments, additional beamforming report details may be included in the NDPA or associated frames (e.g., sounding poll frame). For example, the granularity level may indicate a minimum number of resource units to utilize the set of fine level tone groupings. In another example embodiment, one tone grouping in a set of coarse tone groupings may indicate that a beamformee is to report only one feedback (e.g., signal to noise ratio/signal interference to noise ratio (SNR/SINR) and/or steering matrix) per RU for some specifically indicated RUs (from the total set of RUs within the operational bandwidth between the beamformer and beemformee), or to not report a value for one or more other specifically indicated RUs. In some embodiments, when fulfilling the request by the beamformer that requests a minimum number of RUs to utilize the set of fine or coarse level tone groupings, a beamformee may report only one feedback (e.g., SNR/SINR and/or steering matrix) per remaining RU or may not report any value per RU for the remaining RUs. When a beamformee does not report any value per RU for some RUs, the beamformee identifies such RUs in the beamforming report.

For each STA that is designated to be a beamformee in the WLAN, a level of granularity of feedback is determined based on the capabilities of the STA and the level of accuracy that is optimal for the given STA in determining feedback (Block 203). The process then continues by generating a frame at the AP/beamformer to initiate the sounding procedure (Block 205). In some embodiments, the frame is an NDP announcement (NDPA) frame. The NDPA frame can include information identifying each of the STAs that are to participate in the sounding procedure. In some embodiments, the frame can also include additional information to communicate to the STAs/beamformees. This information can include the type of feedback that is to be returned by each of the STAs. This can be specified on a per STA basis using a STA info field or similar field. The type of feedback field can specify the granularity of the feedback that is to be returned in a Compressed Beamforming Report. In some embodiments, this can be a fine or coarse feedback type or similar specification of the granularity.

In particular, the NDPA frame format, which is described further herein below with regard to FIG. 6, includes a set of STA info fields (i.e., one for each STA to be a beamformee) and a sounding dialog token that defines particulars of the feedback to be returned in terms of granularity. The sounding dialog token (an example of which is described further below with regard to Table I) includes a grouping set field and a fine report request field. The grouping set field defines a value that indicates whether the beamformees should select an Ng from either the fine grouping set or the coarse grouping set (Ng) for the overall bandwidth of the channel. In some embodiments, the sounding dialog token alternatively includes a fine report request field. The fine report request field defines a fine grouping or coarse grouping set per each RU as an alternative to the grouping set specified in the grouping set field. In further embodiments, the fine report request field can also be utilized to define a minimum number of RUs (e.g. an RU with a priori known size) that are to be reported with a fine grouping or coarse grouping. The fine report request field can be used to define both of these aspects in the same sounding dialog token.

These fields of the sounding dialog token can be used in varying combinations to define numerous scenarios for configuring the sounding procedure. The fields can be used by the beamformer to request a Compressed Beamforming Report with coarse/fine tone grouping for the entire bandwidth through use of the grouping set field. A beamformer can request a Compressed Beamforming Report with fine tone grouping for some RUs and at least coarse reporting for some of RUs using the fine report request field in addition to the grouping set field. In another scenario, the beamformer can request a Compressed Beamforming Report with fine/coarse tone grouping for some RUs and the coarsest report (e.g., single feedback per RU) for the rest of RUs again using the fine report request field and grouping set field. In another scenario, the beamformer can request a Compressed Beamforming Report with fine/coarse tone grouping for some RUs and no report for the rest of RUs again using the fine report request field and grouping set field. In a further scenario, the beamformer requests a Compressed Beamforming Report with some minimum number of RUs with fine tone grouping using grouping set and the latter aspect of the fine report request. Specific example implementations are discussed herein below with reference to Table I.

Once the frame has been generated and the feedback level designated for each STA, then the frame can be sent to the next (or all) of the STAs in the WLAN communicating on a given channel (Block 207). In some embodiments, the initial frame sent may be the NDPA and it may identify each of the STAs (i.e., via the set of STA info fields) to take place in the sounding procedure as well as the sounding dialog token with enhanced fields as discussed above. A subsequent frame such as an NDP frame is sent on the channel to provide a reference for all the STAs identified in the NDPA and after which a response from the first STA (where there is more than one) on the list of identified STAs (Block 209) follows. The subsequent frame may include reference symbols for determining the qualities of a channel for the beamformee to report back to the beamformer.

The beamformer (e.g., AP) then receives the response frame from the first STA (Block 211). This response frame will follow the directions of the NDPA that set the level of granularity for the first STA. The beamformer (e.g., AP) analyzes the feedback and utilizes the information to form or update the steering matrix or compressed beamforming report. In other embodiments, the update and calculation of the steering matrix or compressed beamforming report may be performed after the completion of the sounding feedback sequence. The beamformer also checks whether all STAs in the sounding feedback sequence have responded (Block 213). If all of the STAs have not responded then the process can continue by generating another frame to be communicated on the channel to elicit the feedback or response frame of the next STA.

After the first STA has been contacted, then the subsequent STA in a MU MIMO scenario may be sent a BF Report Poll frame or similar message (Block 209). The next STA then responds with feedback having a designated level of granularity as specified in the NDPA for that STA (Block 211). The procedure iterates until all of the STAs have responded to the sounding procedure. In some embodiments, the beamforming report poll frame may include granularity information for the STA/beamformee being polled such that each beamforming report poll frame includes separate granularity information for the STA/beamformee being polled.

FIG. 3 is a flowchart of one embodiment of a process implemented by the beamformee for providing a granularity of feedback in a Beamforming Report requested by the beamformer. The embodiments of this procedure mirror that of the beamformer (e.g., the AP) such that the beamformee responds to the sounding frame of the beamformer and the information therein related to the granularity of feedback to be provided. In the embodiments, the sounding procedure, as it is implemented at the beamformees, responds to receiving a frame from the beamformer over a wireless medium, specifically, a channel of the wireless medium (Block 301). In some embodiments, the beamformee is a STA that has been identified by the AP in the received frame. In some embodiments, the received frame is one of a set of frames that are transmitted by the AP that can include frames that are addressed to all of the STAs and frames that are addressed to individual STAs. The received frame may be an NDPA that includes the station list identifying the receiving STA that is implementing the procedure, and in some cases a subsequent NDP. The subsequent NDP may include reference signals for determining the quality of the channel, which will be reported back to the beamformer in a feedback matrix. Other STAs that are not identified in the NDPA frame would ignore the sounding procedure and remain idle on the channel until completed. One of the received frames can also be a BF Report Poll frame, where the STA is not the first to respond in the sounding procedure. However, the NDPA or an initial frame will include the station list and will include on a per STA basis the level of granularity of feedback to be provided by that STA. In some embodiments, the beamforming report poll frame may include granularity information for the STA/beamformee being polled such that each beamforming report poll frame includes separate granularity information for the STA/beamformee being polled.

The received frame is accessed to determine a level of granularity for the feedback that is requested (Block 303). The received frame may include a level of granularity of feedback in the form of a value that specifies the tone grouping per RUs of the feedback, requesting or requiring a response frame from which the feedback is derived. In particular, the received frame may include a sounding dialog token with a grouping set field and in some embodiments a fine report request field. The grouping set may identify whether a fine grouping set or coarse grouping set (Ng) is to be utilized. This can be specified on an overall bandwidth, or similar level of precision. In some example cases, the grouping set field and fine report request field can be used in numerous cases by combination of the uses of the two fields and in some embodiments, sub-fields within these fields. For example, the beamformer may request a Compressed Beamforming Report with coarse/fine tone grouping for the entire bandwidth using the group settings field, fine tone grouping for some RUs and at least coarse report (including one feedback report per RU) for the rest of RUs using the group settings field and fine report request field, fine/coarse tone grouping for some RUs and no report for the rest of RUs, using the group settings field and a first sub-field of the fine report request field, or a minimum number of RUs with fine tone grouping using the group setting field and a second sub-field of the fine report request field.

In some embodiments, the beamformees may select an Ng value for the tone grouping sets indicated by the beamformer. For example, the beamformer may indicate that a particular beamformee must select one Ng value from a fine tone grouping set (e.g., Ng=1, 2, or 4). Accordingly, the beamformer may select an Ng values from the fine tone grouping set and apply this value when generating a beamforming report frame based on a previously received NDP frame.

As noted above, a response frame is then generated with a feedback matrix having the specified level of granularity (Block 305). The response frame may include a grouping set field in addition to the feedback matrix. The grouping set field may be present in a MIMO control field in the Compressed Beamforming Report. The Grouping Set field is similar to the Grouping Set field used in the sounding frame, but in the context of the Compressed Beamforming Report provides information to the beamformer regarding the grouping that the beamformee selected from the fine grouping or course grouping that was specified for a given STA by the beamformer. The Grouping Set field can be used to indicate which level of fine or coarse grouping was selected by the beamformee such that the beamformer can properly parse and interpret the Compressed Beamforming Report with the knowledge of the groupings utilized in generating the Compressed Beamforming Report. An example implementation of the Grouping Set field is discussed herein below with regard to Table III. The beamformee sets a value of the Grouping Set field to indicate whether a fine or coarse grouping was used per RU and in particular what Ng level was selected/used. In some example embodiments, the beamformee uses a first sub-field of the Grouping Set field to define the grouping set per each RU that is being reported in the Compressed Beamforming Report. In further example embodiments, the beamformee utilizes a second sub-field of the Grouping Set to indicate a minimum number of RUs with a request fine grouping that have been provided in the response frame (e.g., a Compressed Beamforming Report). In further example embodiments, when fulfilling the request by the beamformer that indicates a minimum number of RUs to utilize the set of fine or coarse level tone groupings, the beamformee may report only one feedback (e.g., SNR/SINR and/or steering matrix) per remaining RU that was not reported with a fine level tone grouping or may not report any value per RU for the remaining RUs. When a beamformee does not report any value per RU for some RUs, the beamformee identifies such RUs in the beamforming report. The selection of the fine or coarse grouping options used to generate the feedback for the response frame can be based on the capabilities of the beamformee, configuration of the beamformee or similar criteria. In one example embodiment, as each of the selections are made or after all of the selection have been made from the options provided by the beamformer they may be recorded in the Grouping Set field of the Compressed Beamforming Report. The generated response frame including the Compressed Beamforming Report and the Grouping Set field is then sent back to the beamformer (e.g., AP) that sent the sounding frame (Block 307). The response frame may be a Compressed Beamforming Report or similar frame.

The APs and STAs in a WLAN may have varying capabilities. In particular with reference to support for varying levels of granularity in feedback matrix reporting in the VHT Compressed Beamforming Report, the APs and STAs of the WLAN may support differing ranges and configurations of groupings of sub-channels of RUs. These capabilities may be communicated during initial communications between the AP and STAs as capability elements. A set of example fields and elements for enabling the configuration of the level of granularity in feedback for the beamformees is discussed below. The embodiments described herein can utilize a number of new fields and subfields to enable the Beamformer and Beamformee to implement the sounding procedure as described herein below.

Figures 4A, 4B:
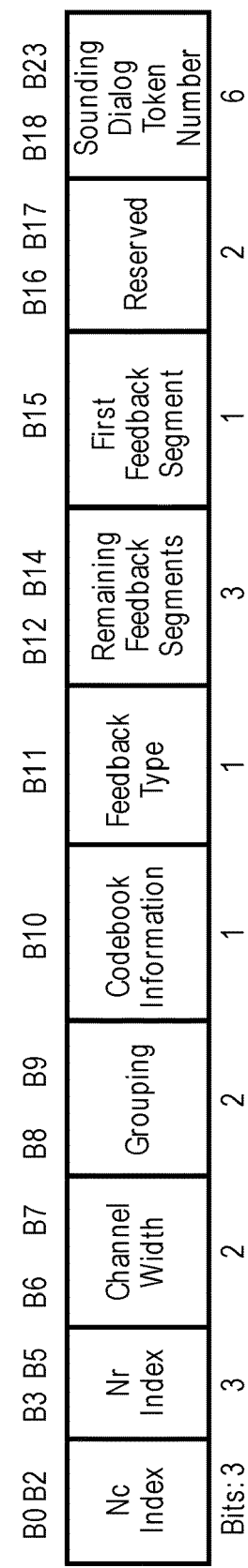
FIG. 4A is a diagram of the VHT Compressed Beamforming report Action field format.
FIG. 4B is a diagram of the VHT MIMO Control field.

FIG. 4A is a diagram of the VHT Compressed Beamforming report Action field format. The VHT Compressed Beamforming Report frame is an Action No Acknowledgement (Ack) frame of category VHT. The Action field of a VHT Compressed Beamforming frame contains the information shown in FIG. 4A. The VHT MIMO Control field is included in every VHT Compressed Beamforming frame. FIG. 4B is a diagram of the VHT MIMO Control field. Both Figures are referenced in the discussion herein below.

The VHT Compressed Beamforming Report field is used by the VHT Compressed Beamforming feedback to carry explicit feedback information in the form of angles representing compressed beamforming feedback matrices V for use by a transmit beamformer to determine steering matrices Q, as part of explicit feedback beamforming. The size of the VHT Compressed Beamforming Report field depends on the values in the VHT MIMO Control field. The VHT Compressed Beamforming Report field contains VHT Compressed Beamforming Report information or successive (possibly zero-length) portions thereof in the case of segmented VHT Compressed Beamforming feedback as part of a VHT sounding protocol). VHT Compressed Beamforming Report information is included in the VHT Compressed Beamforming feedback.

The VHT Compressed Beamforming Report information contains the channel matrix elements indexed, first, by matrix angles in a specified order of angles in the compressed Beamforming Feedback Matrix subfield and, second, by data subcarrier index from lowest frequency to highest frequency. These angles are generated from the beamforming feedback matrix V are understood as part of the compressed beamforming feedback matrix). In the order of angles in the Compressed Beamforming Feedback Matrix subfield, Nc is the number of columns in a compressed beamforming feedback matrix determined by the Nc Index field of the VHT MIMO Control field, Nr is the number of rows in a compressed beamforming feedback matrix determined by the Nr Index field of the VHT MIMO Control field.

As described more generally above, a VHT beamformer initiates a sounding feedback sequence by transmitting a VHT NDP Announcement frame followed by a VHT NDP after a SIFS. The VHT beamformer includes in the VHT NDP Announcement frame one STA Info field for each VHT beamformee that is expected to prepare VHT Compressed Beamforming feedback and may identify the VHT beamformee by including the VHT beamformee's association identifier (AID) in the AID subfield of the STA Info field. The VHT NDP Announcement frame includes at least one STA Info field.

A STA that transmits a VHT NDP Announcement frame to a direct link setup (DLS) or tunneled direct link setup (TDLS) peer STA obtains the AID for the peer STA from the DLS Setup Request, DLS Setup Response, TDLS Setup Request or TDLS Setup Response frame. A VHT beamformer does not transmit either a VHT NDP Announcement+HTC frame or a Beamforming Report Poll+HTC frame that contains an HT variant HT Control field. A VHT NDP is transmitted only following a SIFS after a VHT NDP Announcement frame. A VHT NDP Announcement frame may be followed by a VHT NDP after SIFS. A VHT beamformer that has not received from a STA a VHT Capabilities element or where the last VHT Capabilities element received from the STA has the SU Beamformee Capable field set to false (i.e., 0) does not transmit either of the following a VHT NDP Announcement frame addressed to the STA or that includes the STA's AID in one of the STA Info fields, or a Beamforming Report Poll frame to the STA.

A VHT beamformer that transmits a VHT NDP Announcement frame to a VHT SU-only beamformee may include only one STA Info field in the VHT NDP Announcement frame and set the Feedback Type subfield of the STA Info field to SU. If the VHT NDP Announcement frame includes more than one STA Info field, the receiver address (RA) of the VHT NDP Announcement frame may be set to the broadcast address. If the VHT NDP Announcement frame includes a single STA Info field, the RA of the VHT NDP Announcement frame is set to the MAC address of the VHT beamformee. A VHT NDP Announcement frame didn't include two or more STA Info fields with same value in the AID subfield. A VHT beamformer that transmits a VHT NDP Announcement frame to a VHT beamformee that is an AP, mesh STA or STA that is a member of an independent basis service set (IBSS), includes a single STA Info field in the VHT NDP Announcement frame and sets the AID field in the STA Info field to false (i.e., 0).

A VHT NDP Announcement frame with more than one STA Info field does not carry a VHT variant HT Control field, unless all the STAs listed in the AID field of the STA Info fields have set+HTC-VHT Capable to true (i.e., 1) in the VHT Capabilities Info field. A VHT beamformer that transmits a VHT NDP Announcement frame with more than one STA Info field may transmit any Beamforming Report Poll frames used to retrieve VHT Compressed Beamforming feedback from the intended VHT beamformees in the same transmission opportunity (TXOP). If the duration of the TXOP that contained the VHT NDP Announcement frame has insufficient duration to accommodate the transmission of all of the feedback reports, the VHT beamformer may poll for the remaining VHT Compressed Beamforming feedback in subsequent TXOPs.

In some embodiments, the transmission of the VHT NDP Announcement, VHT NDP, VHT Compressed Beamforming and Beamforming Report Poll frames is subject to the rules in for multiple frame transmission in an enhanced distributed channel access (EDCA) TXOP. A VHT beamformer that sets the Feedback Type subfield of a STA Info field to MU also sets the Nc Index subfield of the same STA Info field to a value equal to or less than the minimum of both the following: the maximum number of supported spatial streams according to the corresponding VHT beamformee's Rx VHT-MCS Map subfield in the Supported VHT-MCS and NSS Set field, or the maximum number of supported spatial streams according to the Rx NSS subfield value in the Operating Mode field of the most recently received Operating Mode Notification frame or Operating Mode Notification element with the Rx NSS Type subfield equal to false (i.e., 0) from the corresponding VHT Beamformee.

A non-AP VHT beamformee that receives a VHT NDP Announcement frame from a VHT beamformer with which it is associated or has an established DLS or TDLS session and that contains the VHT beamformee's AID in the AID subfield of the first (or only) STA Info field and also receives a VHT NDP a SIFS after the VHT NDP Announcement frame, transmits the PPDU containing its VHT Compressed Beamforming feedback a SIFS after the VHT NDP. A VHT beamformee that is an AP, mesh STA, or STA that is a member of an MSS, that receives a VHT NDP Announcement frame with the RA matching its MAC address and the AID subfield of the only STA Info field set to false (i.e. 0), and that also receives a VHT NDP a SIFS after the VHT NDP Announcement frame, transmits the PPDU containing its VHT Compressed Beamforming feedback a SIFS after the VHT NDP. The TXVECTOR parameter CH_BANDWIDTH of the PPDU containing the VHT Compressed Beamforming feedback may be set to indicate a bandwidth not wider than that indicated in the RXVECTOR parameter CH_BANDWIDTH of the received VHT NDP frame. A STA ignores received VHT NDP Announcement, VHT NDP, and Beamforming Report Poll frames if dot11VHTSUBeamformeeImplemented is false. Similarly, a VHT beamformee indicates the maximum number of space-time streams it can receive in a VHT NDP in the Beamformee STS Capability field. If the beamformee is a non-AP STA, this may also be the maximum total number of space-time streams that the STA can receive in a VHT MU PPDU. As mentioned above, these capabilities are exchanged between STAs during initial communication and this information is maintained during the operation of the APs and STAs.

As set forth generally above, the data frame exchanges described herein could be performed with single-antenna transmission or multiple-antenna transmission (also referred to as multiple-input multiple-output or MIMO). In the case of multiple-antenna or MIMO transmission, multiple spatial streams (SS) are sent within the same frame from one IEEE 802.11 STA, which is usually called beamformer (BFer), to another IEEE 802.11 STA, which is usually called beamformee (BFee), and this type of transmission is called BF, or MIMO. BF and MIMO transmissions are usually enhanced by some frame initial exchanges so that the BFer knows about the MIMO channel condition of the BFee. This initial exchange of frames before the actual data frame exchange is called sounding procedure. The frame that might be used in sounding procedure are: HT and VHT NDP frame, VHT MIMO Compressed Beamforming Report, VHT NDP Announcement (NDPA) frame, VHT Beamforming Report Poll. Each of these frame might have various fields and subfields such as: VHT MIMO Control, VHT Compressed Beamforming Report, MU Exclusive Beamforming Report, Sounding Dialog Token, STA Info field, etc.

The example embodiments provide herein below provide specific enhanced procedures for sounding exchanges where new fields and subfields are introduced. The newly introduced fields and subfields may be prefixed with HE (that stands for high-efficiency WLAN or IEEE 802.1 lax), some of which are within the previously defined VHT frames.

The general sounding procedure described herein can be adapted as a high efficiency (HE) sounding procedure embodiment. With the HE sounding procedure, the beamforming process and DL-MU-MIMO require knowledge of the channel state to compute a steering matrix or compressed beamforming that is applied to the transmitted signal to optimize reception at one or more receivers. The STA transmitting using the steering matrix is called the VHT beamformer or HE beamformer and a STA for which reception is optimized is called a VHT beamformee or HE beamformee. An explicit feedback mechanism is used where the VHT beamformee directly measures the channel from the training symbols transmitted by the VHT beamformer and sends back a transformed estimate of the channel state to the VHT beamformer. The VHT beamformer then uses this estimate, perhaps combining estimates from multiple VHT beamformees, to derive the steering matrix or compressed beamforming report. For HE STAs, a mixed feedback mechanism, that allows both fine and coarse sounding, is used where the HE beamformee directly measures the channel from the training symbols transmitted by the HE beamformer and sends back a transformed estimate of the channel state to the HE beamformer either in a coarse or fine sounding.

With regard to capability elements of the HE STAs, if dot11HESUBeamformerOptionImplemented is set to true, then a STA sets the SU Beamformer Capable field in the HE Capabilities element to true (i.e., 1). If dot11HESUBeamformeeOptionImplemented is set to true, then a STA sets the SU Beamformee Capable field in the HE Capabilities element to true (i.e., 1). If dot11HEMUBeamformerOptionImplemented is true, then a STA sets the MU Beamformer Capable field in the HE Capabilities element to true (i.e., 1). If dot11HEMUBeamformeeOptionImplemented is set to true, then a STA may set the MU Beamformee Capable field in the HE Capabilities element to true (i.e., 1). If dot11HEMUBeamformerOptionImplemented is true, a STA may set dot11HESUBeamformerOptionImplemented to true. If dot11HEMUBeamformeeOptionImplemented is true, a STA may set dot11HESUBeamformeeOptionImplemented to true. A STA is a HE SU-only beamformer if it sets the SU Beamformer Capable field to true (i.e., 1), but sets the MU Beamformer Capable field to false (i.e., 0) in transmitted VHT Capabilities elements. A STA is an SU-only beamformee if it sets the SU Beamformee Capable field to (i.e., 1), but sets the MU Beamformee Capable field to (i.e., 0) in transmitted VHT Capabilities elements.

In some example embodiments, the configuration information within STAs or configuration information exchanged between the STAs can indicate support for and the STAs role in the VHT sounding procedure. A set of example fields, rules, and elements for tracking the role and operation of the STAs is discussed below. The specific example below is for the HE sounding process implementation.

A HE beamformer initiates a sounding feedback sequence by transmitting a VHT NDP Announcement or HE NDP Announcement frame followed by a VHT NDP or HE NDP after a SIFS or followed by a HE NDP after a SIFS and then a VHT NDP after another SIFS interval. The HE beamformer includes in the VHT NDP Announcement frame or HE NDP Announcement frame one STA Info field for each VHT beamformee or HE beamformee that is expected to prepare VHT or HE Compressed Beamforming feedback and identifies the VHT beamformee or HE beamformee by including the VHT beamformee's AID in the AID subfield of the STA Info field or by including the HE beamformee's AID in the AID subfield of the STA Info field. The VHT NDP Announcement frame or HE NDP Announcement frame includes at least one STA Info field.

The HE beamformer may indicate in the VHT NDP Announcement frame or HE NDP Announcement frame the first STA Info field with an AID value that does not correspond to an AID of any of its associated clients. In some embodiments, such AID might be assigned a value of all-zero, or a value of all-one bits. Since no associated client has such AID, the HE beamformer, after sending VHT NDP Announcement frame or HE NDP Announcement frame, sends a VHT NDP after SIFS, or an HE NDP after SIFS, or a HE NDP after SIFS followed by a VHT NDP after SIFS, and after an interval of SIFS the HE beamformer sends a Beamforming Report Poll or HE Beamforming Report Poll for one of the VHT or HE beamformees whose AID has appeared in a STA info field in the VHT NDP Announcement frame or HE NDP Announcement frame. A STA that transmits a VHT NDP Announcement frame or a HE NDP Announcement frame to a DLS or TDLS peer STA obtains the AID for the peer STA from the DLS Setup Request, DLS Setup Response, TDLS Setup Request or TDLS Setup Response frame.

A VHT beamformer or HE beamformer does not transmit either a VHT NDP Announcement+HTC frame or a HE NDP Announcement+HTC frame or a Beamforming Report Poll+HTC frame that contains an HT variant HT Control field. A VHT NDP or HE NDP is transmitted following a SIFS after a VHT NDP Announcement or HE NDP Announcement frame, or a VHT NDP is transmitted following a SIFS after a HE NDP where the HE NDP follows a VHT NDP Announcement frame. A VHT NDP Announcement frame or HE NDP Announcement frame is followed by a VHT NDP or a HE NDP after SIFS.

An HE beamformer that has not received from a STA an HE Capabilities element or where the last HE Capabilities element received from the STA has the SU Beamformee Capable field set to false (i.e., 0) does not transmit either of the following: a VHT NDP Announcement frame or HE NDP Announcement frame addressed to the STA or that includes the STA's AID in one of the STA Info fields, or a Beamforming Report Poll frame or HE Beamforming Report Poll frame to the STA.

A HE beamformer that transmits a VHT NDP Announcement frame or HE NDP Announcement frame to a HE SU-only beamformee includes only one STA Info field in the VHT NDP Announcement frame or HE NDP Announcement frame and sets the Feedback Type subfield of the STA Info field to SU. If the VHT NDP Announcement frame or HE NDP Announcement frame includes more than one STA Info field, the RA of the VHT NDP Announcement frame or the HE NDP Announcement frame is set to the broadcast address. If the VHT NDP Announcement frame or the HE NDP Announcement frame includes a single STA Info field, the RA of the VHT NDP Announcement frame is set to the MAC address of the VHT beamformee. A VHT NDP Announcement frame or a HE NDP Announcement frame does not include two or more STA Info fields with same value in the AID subfield.

A VHT beamformer that transmits a VHT NDP Announcement frame or a HE NDP Announcement frame to a VHT beamformee or HE beamformee that is an AP, mesh STA or STA that is a member of an IBSS, includes a single STA Info field in the VHT NDP Announcement frame or the HE NDP Announcement frame and may set the AID field in the STA Info field to false (i.e., 0). A VHT NDP Announcement frame or a HE NDP Announcement frame with more than one STA Info field does not carry a VHT variant HT Control field, unless all the STAs listed in the AID field of the STA Info fields have set+HTC-VHT Capable to true (i.e., 1) in the VHT Capabilities Info field.

A HE beamformer that transmits a VHT NDP Announcement frame or a HE NDP Announcement frame with more than one STA Info field may transmit any Beamforming Report Poll or HE Beamforming Report Poll frames used to retrieve VHT Compressed Beamforming feedback or HE NDP Compressed Beamforming feedback from the intended VHT or HE beamformees in the same TXOP. If the duration of the TXOP that contained the VHT NDP Announcement frame or the HE NDP Announcement frame has insufficient duration to accommodate the transmission of all of the feedback reports, then the VHT beamformer may poll for the remaining VHT Compressed Beamforming or HE Compressed Beamforming feedback in subsequent TXOPs.

The transmission of the VHT NDP Announcement, HE NDP Announcement frame, VHT NDP, HE NDP, VHT Compressed Beamforming, HE Compressed Beamforming, and HE Beamforming Report Poll frames is subject to the rules of multiple frame transmission in an EDCA TXOP.

A HE beamformer that sets the Feedback Type subfield of a STA Info field to MU may set the Nc Index subfield of the same STA Info field to a value equal to or less than the minimum of both the following: the maximum number of supported spatial streams according to the corresponding VHT beamformee's Rx VHT-MCS Map subfield in the Supported VHT-MCS and NSS Set field or the corresponding HE beamformee's Rx HE-MCS Map subfield in the Supported HE-MCS and NSS Set field, or the maximum number of supported spatial streams according to the Rx NSS subfield value in the Operating Mode field of the most recently received Operating Mode Notification frame or Operating Mode Notification element with the Rx NSS Type subfield equal to false (i.e., 0) from the corresponding VHT beamformee or HE beamformee.

An HE Compressed Beamforming frame is an Action No Ack frame of category HE. The Action field of a HE Compressed Beamforming frame contains the following: category, HE Action, HE MIMO Control, HE Compressed Beamforming Report, MU Exclusive Beamforming Report. Alternatively, HE Compressed Beamforming frame contains the following: category, HE Action, VHT MIMO Control, VHT Compressed Beamforming Report, MU Exclusive Beamforming Report.

Figure 5:
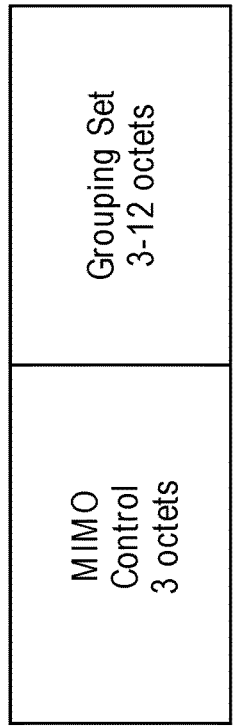
FIG. 5 is a diagram of an HE MIMO Control field.

FIG. 5 is a diagram of an HE MIMO Control field. The HE MIMO Control field includes MIMO Control field as a subset. In some embodiments, the HE MIMO Control field has an additional subfield which is called a Grouping Set. This subfield exists if the Grouping subfield in the MIMO Control field is set to value 3 (bit representation 11), in which case the length of Grouping Set depends on the width of the channel in which the measurement to create the compressed beamforming feedback matrix was made. If the Channel Width subfield in MIMO Control field is set to 0 (false) then Grouping Set has the length of 3 octets, if the Channel Width subfield in MIMO Control field is set to 1 (true), then Grouping Set has the length of 6 octets, if the Channel Width subfield in MIMO Control field is set to 2 then Grouping Set has the length of 9 octets, and if the Channel Width subfield in VHT Control field is set to 3 then Grouping Set has the length of 12 octets. Each set of bit positions (B+3, B+2, B+1, B) in Grouping Set indicates the subcarrier grouping used for the compressed beamforming feedback matrix for sub-band B, where for 5 MHz sub-bands B takes values 4×i for i=0-3 for when Channel Width is set to 0 or 20 MHz, and takes values 4×i for i=0-7 for when Channel Width is set to 1 or 40 MHz, and takes values 4×i for i=0-11 for when Channel Width is set to 2 or 80 MHz, and takes values 4×i for i=0-15 for when Channel Width is set to 3 or 160 MHz or 80+80 MHz. Each set of bits (B+3, B+2, B+1, B) is set to 0 for Ng=1 (No grouping), set to 1 for Ng=2, set to 2 for Ng=4, set to 3 for Ng=8, set to 4 for Ng=16, and values 5-16 are reserved. In the following the set of Ng={1, 2, 4} is referred to as the fine grouping set and the set Ng={4, 8, 16} is referred to as coarse grouping set. However, depending on the HE specification, the fine and coarse grouping sets could have other values. For instance, coarse grouping set could be e.g. Ng={4, 8, 16, 32, 64}. Such large number of Ng allows for low overhead sounding feedback for resource-units (RU) or sub-bands for the sub-bands that is not among the best sub-bands or RUs of a STA. For instance, an AP might realize from earlier sounding for a given STA that some sub-bands experience lower strength or deep fading for the said STA, then the AP might request coarse sounding feedback for those sub-bands.

The HE Compressed Beamforming Report field is used by the HE Compressed Beamforming feedback to carry explicit feedback information in the form of angles representing compressed beamforming feedback matrices V for use by a transmit beamformer to determine steering matrices Q, as described in explicit feedback beamforming. The size of the VHT Compressed Beamforming Report field depends on the values in the VHT MIMO Control field or HE MIMO Control field. The HE Compressed Beamforming Report field contains VHT Compressed Beamforming Report information or successive (possibly zero-length) portions thereof in the case of segmented VHT Compressed Beamforming feedback (see VHT sounding protocol). VHT Compressed Beamforming Report information is always included in the VHT Compressed Beamforming feedback.

Several example scenarios can apply the sounding procedure and parameters as described herein above. In one example, an HE beamformer sends a VHT NDPA and VHT NDP to an HE Beamformee and receives a VHT or HE Compressed Beamforming Feedback. In this example, a non-AP HE beamformee that receives a VHT NDP Announcement frame from a HE beamformer with which it is associated or has an established DLS or TDLS session and that contains the HE beamformee's AID in the AID subfield of the first (or only) STA Info field and also receives a VHT NDP or HE NDP a SIFS after the VHT NDP Announcement frame, or receives a HE NDP after a SIFS after the VHT NDP Announcement frame followed by a VHT NDP after a SIFS, may transmit the PPDU containing its VHT Compressed Beamforming feedback or HE Compressed Beamforming feedback a SIFS after the VHT NDP frame. A HE beamformee that is an AP, mesh STA, or STA that is a member of an IBSS, that receives a VHT NDP Announcement frame with the RA matching its MAC address and the AID subfield of the only STA Info field set to 0 (false), and that also receives a VHT NDP or HE NDP a SIFS after the VHT NDP Announcement frame, or receives a HE NDP after a SIFS after the VHT NDP Announcement frame followed by a VHT NDP after a SIFS, may transmit the PPDU containing its VHT Compressed Beamforming feedback or HE Compressed Beamforming feedback a SIFS after the VHT NDP or HE NDP. The TXVECTOR parameter CH_BANDWIDTH of the PPDU containing the VHT Compressed Beamforming feedback or HE Compressed Beamforming feedback may be set to indicate a bandwidth equal to that indicated in the RXVECTOR parameter CH_BANDWIDTH of the received VHT NDP frame or HE NDP frame.

In another example, an HE beamformer sends an HD NDPA to an HE beamformee and receives a VHT Compressed Beamforming feedback. A non-AP HE beamformee that receives a HE NDP Announcement frame from a HE beamformer with which it is associated or has an established DLS or TDLS session and that contains the HE beamformee's AID in the AID subfield of the first (or only) STA Info field and also receives a VHT NDP or HE NDP a SIFS after the HE NDP Announcement frame, may transmit the PPDU containing its VHT Compressed Beamforming feedback or HE Compressed Beamforming feedback a SIFS after the VHT NDP or HE NDP. A HE beamformee that is an AP, mesh STA, or STA that is a member of an IBSS, that receives a HE NDP Announcement frame with the RA matching its MAC address and the AID subfield of the only STA Info field set to 0 (false), and that also receives a VHT NDP or HE NDP a SIFS after the HE NDP Announcement frame, may transmit the PPDU containing its VHT Compressed Beamforming feedback or HE Compressed Beamforming feedback a SIFS after the VHT NDP or HE NDP. The TXVECTOR parameter CH_BANDWIDTH of the PPDU containing the VHT Compressed Beamforming feedback may be set to indicate a bandwidth equal to that indicated in the RXVECTOR parameter CH_BANDWIDTH of the received VHT NDP frame or HE NDP frame. If the subfield in the HE NDPA Announcement is set to 1 (bit representation 01) then the HE beamformee should send VHT or HE Compressed Beamforming Report with Ng chosen from the coarse grouping set, and if it is set to 2 (bit representation 10) then the HE beamformee should send VHT or HE Compressed Beamforming Report with Ng chosen from the fine grouping set, and if it is set to 0 (bit representation 00) then the HE beamformee should send VHT or HE Compressed Beamforming Report with Ng chosen from either fine or coarse grouping set.

A STA ignores received VHT NDP Announcement, HE NDP Announcement, VHT NDP, HE NDP, Beamforming Report Poll, or HE Beamforming Report Poll frames if dot11VHTSUBeamformeeImplemented, dot11HESUBeamformeeImplemented and dot11HESUImplicitBeeImplemented are false.

A VHT beamformee or HE beamformee may indicate the maximum number of space-time streams it can receive in a VHT NDP or HE NDP in the Beamformee STS Capability field. If the beamformee is a non-AP STA, this may also be the maximum total number of space-time streams that the STA can receive in a VHT MU PPDU or HE MU PPDU.

In another scenario, an HE beamformer sends a VHT NDPA, a HE Beamform Report Poll and receives a VHT Compressed Beamforming Report or a HE Beamforming Report. A non-AP HE beamformee that receives a VHT NDP Announcement frame from a HE beamformer with which it is associated or has an established DLS or TDLS session and that contains the HE beamformee's AID in the AID subfield of a STA Info field that is not the first STA Info field may either transmit its VHT Compressed Beamforming feedback or HE Compressed Beamforming feedback a SIFS after receiving a Beamforming Report Poll or HE Beamforming Report Poll with RA matching its MAC address and a non-bandwidth signaling TA obtained from the TA field matching the MAC address of the HE beamformer. If the RXVECTOR parameter CH_BANDWIDTH_IN_NON_HT of the received Beamforming Report Poll frame or HE Beamforming Report Poll frame is valid, the TXVECTOR parameter CH_BANDWIDTH of the PPDU containing the VHT Compressed Beamforming feedback or HE Compressed Beamforming feedback may be set to indicate a bandwidth equal to that indicated by the RXVECTOR parameter CH_BANDWIDTH_IN_NON_HT of the Beamforming Report Poll frame or HE Beamforming Report Poll frame; otherwise, the TXVECTOR parameter CH_BANDWIDTH of the PPDU containing VHT Compressed Beamforming feedback or HE Compressed Beamforming feedback may be set to indicate a bandwidth equal to that indicated by the RXVECTOR parameter CH_BANDWIDTH of the Beamforming Report Poll frame. If the Grouping Set subfield in the HE Beamforming Report Poll is set to 0 then the HE beamformee should send VHT or HE Compressed Beamforming Report where Ng is chosen from the coarse grouping set, and if it is set to 1 then the HE beamformee should send VHT or HE Compressed Beamforming Report where Ng is chosen from the fine grouping set and if the HE beamformee is not capable of preparing the VHT or HE Compressed Beamforming Report with an Ng that belongs to the fine grouping set then the HE beamformee should chose the maximum Ng that belongs it is capable of preparing the VHT or HE Compressed Beamforming Report with. If the Grouping Set subfield in the HE Beamforming Report Poll is set to 2 then the HE beamformee should send VHT or HE Compressed Beamforming Report where Ng is chosen from either fine or coarse grouping set, and if it is set to 3 then the HE beamformee should send VHT or HE Compressed Beamforming Report where Ng is chosen from coarse grouping set but for the VHT or HE Compressed Beamforming Report field should contain sounding report for the tones that previously were not reported in the last VHT or HE Compressed Beamforming frame. In some other embodiments, each of the bits of the Grouping Set subfield is interpreted as a choice for grouping set for a given frequency sub-band, where if bit position Bi is set to 0 the HE beamformee should chose an Ng from the set of coarse grouping set for the sub-band Bi, otherwise the HE beamformee should chose an Ng from the set of fine grouping set for the sub-band Bi.

In a further scenario, an HE beamformer sends an HE NDPA to the HE beamformee and receives a VHT or HE Compressed Beamforming feedback. A non-AP HE beamformee that receives a HE NDP Announcement frame from a HE beamformer with which it is associated or has an established DLS or TDLS session and that contains the HE beamformee's AID in the AID subfield of a STA Info field that is not the first STA Info field may either transmit its VHT Compressed Beamforming feedback or HE Compressed Beamforming feedback a SIFS after receiving a Beamforming Report Poll with RA matching its MAC address and a non-bandwidth signaling TA obtained from the TA field matching the MAC address of the HE beamformer. If the RXVECTOR parameter CH_BANDWIDTH_IN_NON_HT of the received Beamforming Report Poll frame is valid, the TXVECTOR parameter CH_BANDWIDTH of the PPDU containing the VHT Compressed Beamforming feedback or VHT NDP or HE NDP may be set to indicate a bandwidth equal to that indicated by the RXVECTOR parameter CH_BANDWIDTH_IN_NON_HT of the Beamforming Report Poll frame; otherwise, the TXVECTOR parameter CH_BANDWIDTH of the PPDU containing VHT Compressed Beamforming feedback or HE Compressed Beamforming feedback may be set to indicate a bandwidth equal to that indicated by the RXVECTOR parameter CH_BANDWIDTH of the Beamforming Report Poll frame. If the Grouping Set subfield in the HE NDPA Announcement is set to 1 (bit representation 01) then the HE beamformee should send VHT or HE Compressed Beamforming Report with Ng chosen from the coarse grouping set, and if it is set to 2 (bit representation 10) then the HE beamformee should send VHT or HE Compressed Beamforming Report with Ng chosen from the fine grouping set, and if it is set to 0 (bit representation 00) then the HE beamformee should send VHT or HE Compressed Beamforming Report with Ng chosen from either fine or coarse grouping set.

In one scenario, an HE beamformer sends an HE NDPA to the HE beamformee and an HE Beamforming Report Poll and receives a VHT Compressed Beamforming feedback. A non-AP HE beamformee that receives a HE NDP Announcement frame from a HE beamformer with which it is associated or has an established DLS or TDLS session and that contains the HE beamformee's AID in the AID subfield of a STA Info field that is not the first STA Info field may transmit either VHT Compressed Beamforming feedback or HE Compressed Beamforming feedback a SIFS after receiving a HE Beamforming Report Poll with RA matching its MAC address and a non-bandwidth signaling TA obtained from the TA field matching the MAC address of the HE beamformer. If the RXVECTOR parameter CH_BANDWIDTH_IN_NON_HT of the received Beamforming Report Poll frame is valid, the TXVECTOR parameter CH_BANDWIDTH of the PPDU containing the HE Compressed Beamforming feedback or VHT NDP or HE NDP may be set to indicate a bandwidth equal to that indicated by the RXVECTOR parameter CH_BANDWIDTH_IN_NON_HT of the Beamforming Report Poll frame; otherwise, the TXVECTOR parameter CH_BANDWIDTH of the PPDU containing HE Compressed Beamforming feedback may be set to indicate a bandwidth equal to that indicated by the RXVECTOR parameter CH_BANDWIDTH of the Beamforming Report Poll frame. If the Grouping Set subfield in the HE Beamforming Report Poll is set to 0 then the HE beamformee should send VHT or HE Compressed Beamforming Report where Ng is chosen from the coarse grouping set, and if it is set to 1 then the HE beamformee should send VHT or HE Compressed Beamforming Report where Ng is chosen from the fine grouping set and if the HE beamformee is not capable of preparing the VHT or HE Compressed Beamforming Report with an Ng that belongs to the fine grouping set then the HE beamformee should chose the maximum Ng that belongs it is capable of preparing the VHT or HE Compressed Beamforming Report with. If the Grouping Set subfield in the HE Beamforming Report Poll is set to 2 then the HE beamformee should send VHT or HE Compressed Beamforming Report where Ng is chosen from either fine or coarse grouping set, and if it is set to 3 then the HE beamformee should send VHT or HE Compressed Beamforming Report where Ng is chosen from coarse grouping set but for the VHT or HE Compressed Beamforming Report field should contain sounding report for the tones that previously were not reported in the last VHT or HE Compressed Beamforming frame. In some other embodiments, each of the bits of the Grouping Set subfield is interpreted as a choice for grouping set for a given frequency sub-band, where if bit position Bi is set to 0 the HE beamformee should chose an Ng from the set of coarse grouping set for the sub-band Bi, otherwise the HE beamformee should chose an Ng from the set of fine grouping set for the sub-band Bi.

The RA field of the VHT Compressed Beamforming or HE Compressed Beamforming frame(s) of the VHT Compressed Beamforming feedback may be set to a non-bandwidth signaling TA obtained from the TA field of the VHT NDP Announcement frame or the HE NDP Announcement frame or the Beamforming Report Poll frame or the HE Beamforming Report Poll frame to which this VHT Compressed Beamforming feedback is a response. If the HE Beamformee is transmitting VHT Compressed Beamforming frame(s) a SIFS after the VHT NDP or HE NDP, then the VHT Compressed Beamforming frame(s) may include the VHT Compressed Beamforming Report information and, for the case of MU feedback, the MU Exclusive Beamforming Report information.

A HE beamformee that transmits a VHT Compressed Beamforming frame or HE Compressed Beamforming frame may set the Feedback Type field in the VHT MIMO Control field to the same value as the Feedback Type field in the corresponding STA Info field in the VHT NDP Announcement frame or the HE NDP Announcement frame. If the Feedback Type field indicates MU, the STA may send a VHT Compressed Beamforming frame with the Nc Index field value in the VHT MIMO Control field equal to the minimum of all the following: the Nc Index field value in the corresponding STA Info field in the VHT NDP Announcement frame or the HE NDP Announcement frame; the maximum number of supported spatial streams according to its Rx VHT-MCS Map subfield in the Supported VHT-MCS and NSS Set field or according to its Rx HE-MCS Map subfield in the Supported HE-MCS and NSS Set field; and the maximum number of supported spatial streams according to its Rx NSS subfield value in the Operating Mode field of the Operating Mode Notification frame or Operating Mode Notification element transmitted most recently by the HE beamformee If the Feedback Type indicates SU, the Nc Index field value in the VHT MIMO Control field is determined by the HE beamformee.

The Nr Index field in the VHT MIMO Control field may be set to the same value as the RXVECTOR parameter NUM_STS of the corresponding VHT NDP. The Nc Index field may not be set to a value larger than the Nr Index value in the VHT MIMO Control field. A HE beamformee may set the value of the Channel Width subfield in the VHT MIMO Control field of a VHT Compressed Beamforming frame to the same value as the RXVECTOR parameter CH_BANDWIDTH of the corresponding VHT NDP frame or HE NDP frame.

An HE beamformee may not include MU Exclusive Beamforming Report information in VHT Compressed Beamforming feedback or HE Compressed Beamforming frame if the Feedback Type subfield in the MIMO Control field of the VHT Compressed Beamforming frame(s) indicates SU. A HE beamformee may include both VHT or HE Compressed Beamforming Report or information and MU Exclusive Beamforming Report information in VHT or HE Compressed Beamforming feedback if the Feedback Type subfield in the MIMO Control field of the VHT Compressed Beamforming frame(s) indicates MU.

An HE beamformee that transmits VHT or HE Compressed Beamforming feedback may include neither the VHT or HE Compressed Beamforming Report information and nor the MU Exclusive Beamforming Report information if the transmission duration of the PPDU carrying the VHT or HE Compressed Beamforming Report information and any MU Exclusive Beamforming Report information would exceed the maximum PPDU duration. The value of the Sounding Dialog Token Number subfield in the VHT MIMO Control field may be set to the same value as the Sounding Dialog Token Number subfield in the Sounding Dialog Token field in the corresponding VHT NDP Announcement frame or HE NDP Announcement frame. If the transmission duration of the planned PPDU carrying the VHT Compressed Beamforming Report information and any MU Exclusive Beamforming Report information would exceed the maximum PPDU duration, the HE beamformee may transmits a VHT NDP or HE NDP frame instead.

The HE beamformer can use the sounding dialog token in the VHT or HE Compressed Beamforming frame(s) of the VHT or HE Compressed Beamforming feedback to associate the feedback with a prior VHT NDP Announcement frame or HE NDP Announcement frame and thus compute the delay between sounding and receiving the feedback. The VHT beamformer can use this delay time when making a decision regarding the applicability of the feedback for the link.

Recovery in the case of a missing response to a VHT NDP Announcement, HE NDP Announcement, Beamforming Report Poll or HE Beamforming Report Poll frame follows the rules for multiple frame transmission in an EDCA TXOP. VHT Compressed Beamforming feedback is comprised of the VHT Compressed Beamforming Report information and the MU Exclusive Beamforming Report information.

A HE beamformee might send its VHT Compressed Beamforming frame with specific content, as described below, in place of VHT NDP or HE NDP in all the situations that was indicated above. In these circumstances the VHT Compressed Beamforming frame does not include VHT Compressed Beamforming Report information nor the MU Exclusive Beamforming Report information. In these circumstances the VHT Compressed Beamforming frame Action field format is: Category, VHT Action, VHT or HE MIMO Control. The content of Category and VHT Action are as specified in IEEE 802.11 specification. The content of VHT or HE MIMO Control are reserved values. In other embodiments, the VHT MIMO Control might be excluded from the VHT Compressed Beamforming frame. The format that caries the VHT Compressed Beamforming frame may be either VHT or HE, and the following TXVECTOR parameters are used for this frame: FORMAT set to VHT or HE; N_TX set to two or larger. In other embodiments N_TX is set to the maximum number of transmit chains the HE beamformee supports; FEC_CODING set to BCC_CODING or LDPC_CODING; APEP_LENGTH set to 0 (false); GI_TYPE set to SHORT_GI if the HE beamformee supports otherwise set to LONG_GI or other GI that HE format supports; MCS set to the maximum MCS that the HE STA supports for the maximum NSS it supports; BEAMFORMED set to 1 (true); NUM_USERS set to 1 (true); NUM_STS is set to at least two. NUM_STS indicates the maximum number of space-time streams that the HE beamformee supports according to its Supported VHT-MCS and NSS Set field or the Supported HE-MCS and NSS Set field in VHT Capabilities or HE Capabilities; and CH_BANDWIDTH set to the same value as the TXVECTOR parameter CH_BANDWIDTH in the preceding VHT NDP Announcement frame or HE NDP Announcement frame.

As indicated above, the embodiments described herein can utilize a number of new fields and subfields to enable the Beamformers and Beamformees to implement the sounding feedback sequence. Some of these fields and subfields have been mentioned or introduced in other contexts and are set forth here for further clarity and definition. The enhanced sounding procedures that are introduced in this disclosure take advantage of several new fields and subfields.

A HE Compressed Beamforming frame has been defined as a modification of the VHT Compressed Beamforming feedback. The HE Compressed Beamforming frame is an Action No Ack frame of category HE. The Action field of a HE Compressed Beamforming frame contains the following: category, HE Action, HE MIMO Control, HE Compressed Beamforming Report, MU Exclusive Beamforming Report. HE MIMO Control field includes MIMO Control field as a subset. In some embodiments, HE MIMO Control field has an additional subfield which is called Grouping Set, as discussed above in reference to FIG. 5. The format of HE MIMO Control field may be as follows: Nc (3 bits): indicates the number of columns, Nc, in the compressed beamforming feedback matrix minus 1—set to 0 for Nc=1, set to 1 for Nc=2, . . . , set to 7 for Nc=8; Nr (2 bits)—indicates the number of rows, Nr, in the compressed beamforming feedback matrix minus 1—set to 0 for Nr=1, set to 1 for Nr=2, . . . , set to 7 for Nr=8; Channel Width (2 bits)—indicates the width of the channel in which the measurement to create the compressed beamforming feedback matrix was made—set to 0 for 20 MHz, Set to 1 for 40 MHz, Set to 2 for 80 MHz, Set to 3 for 160 MHz or 80+80 MHz; Grouping (2 bits)—indicates the subcarrier grouping, Ng, used for the compressed beamforming feedback matrix—set to 0 for Ng=1 (No grouping), set to 1 for Ng=2, set to 2 for Ng=4. The value 3 indicates that the field Grouping Set will follow MIMO Control (and as a whole they form HE MIMO Control) whose length is determined by Channel Width as described below in Grouping Set.

The HE MIMO is further defined to include a codebook Information (1 bit)—indicates the size of codebook entries: if Feedback Type is SU, then set to 0 for 2 bits for $\psi$, 4 bits for $\varphi$, set to 1 for 4 bits for $\psi$, 6 bits for $\varphi$; and if Feedback Type is MU, then set to 0 for 5 bits for $\psi$, 7 bits for $\varphi$, set to 1 for 7 bits for $\psi$, 9 bits for $\varphi$; Feedback Type (1 bit)—indicates the feedback type, set to 0 for SU, set to 1 for MU; and Remaining Feedback Segment (3 bits)—indicates the number of remaining feedback segments for the associated VHT or HE Compressed Beamforming frame: set to 0 for the last feedback segment of a segmented report or the only feedback segment of an unsegmented report, set to a value between 1 and 6 for a feedback segment that is neither the first nor the last of a segmented report, set to a value between 1 and 7 for a feedback segment that is not the last feedback segment of a segmented report. In a retransmitted feedback segment, the field is set to the same value associated with the feedback segment in the original transmission.

The HE MIMO may further define a First Feedback Segment (1 bit)—set to 1 for the first feedback segment of a segmented report or the only feedback segment of an unsegmented report; set to 0 if it is not the first feedback segment or if the VHT Compressed Beamforming Report field and MU Exclusive Beamforming Report field are not present in the frame. In a retransmitted feedback segment, the field is set to the same value associated with the feedback segment in the original transmission. The HE MIMO can also include a Sounding Dialogue Token Number (6 bits)—the sounding dialog token from the VHT or HE NDP Announcement frame soliciting feedback, the Grouping Set (3-12 octets)—this subfield exists if the Grouping subfield in is set to value 3 (bit representation 11), in which case the length of Grouping Set depends on the width of the channel in which the measurement to create the compressed beamforming feedback matrix was made. If the Channel Width subfield in MIMO Control field is set to 0 then Grouping Set has the length of 3 octets, if the Channel Width subfield in MIMO Control field is set to 1 then Grouping Set has the length of 6 octets, if the Channel Width subfield in MIMO Control field is set to 2 then Grouping Set has the length of 9 octets, and if the Channel Width subfield in MIMO Control field is set to 3 then Grouping Set has the length of 12 octets. Each set of bit positions (B+3, B+2, B+1, B) in Grouping Set indicates the subcarrier grouping used for the compressed beamforming feedback matrix for sub-band B, where for 5 MHz sub-bands B takes values 4×i for i=0-3 for when Channel Width is set to 0 or 20 MHz, and takes values 4×i for i=0-7 for when Channel Width is set to 1 or 40 MHz, and takes values 4×i for i=0-11 for when Channel Width is set to 2 or 80 MHz, and takes values 4×i for i=0-15 for when Channel Width is set to 3 or 160 MHz or 80+80 MHz. Each set of bits (B+3, B+2, B+1, B) is set to 0 for Ng=1 (No grouping), set to 1 for Ng=2, set to 2 for Ng=4, set to 3 for Ng=8, set to 4 for Ng=16, and values 5-16 are reserved.

The length of Grouping Set as explained above is 3-12 octets depending on the value of Channel Width. However, depending on the representation for the grouping Ng, the size of Grouping Set might be shorter. For instance, in some embodiments, given two bits for representing Ng, the size of Grouping Set is 2-6 octets. In some other embodiments, given three bits for representing Ng, the size of Grouping Set is 3-9 octets.

Figure 6:
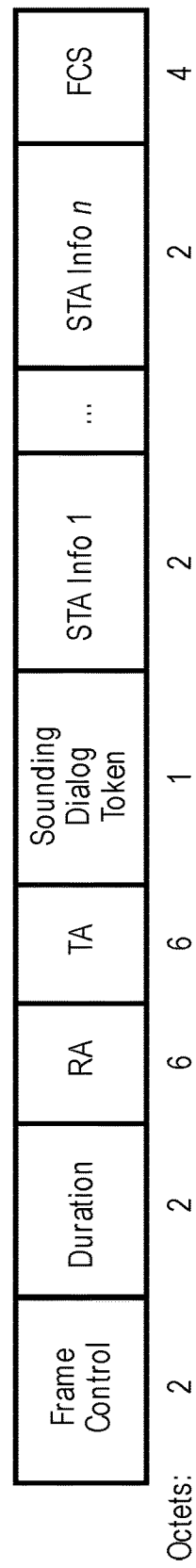
FIG. 6 is a diagram of the frame format of the HE NDP Announcement frame.

FIG. 6 is a diagram of the frame format of the HE NDP Announcement frame. The HE NDP Announcement frame contains at least one STA Info field. If the HE NDP Announcement frame contains only one STA Info field, then the RA field value is the address of the STA identified by the AID in the STA Info field. If the HE NDP Announcement frame contains more than one STA Info field, then the RA field value is the broadcast address. The TA field value is the address of the STA transmitting the HE NDP Announcement frame or a bandwidth signaling TA. In a HE NDP Announcement frame transmitted by a HE STA in a non-HT or non-HT duplicate format and where the scrambling sequence carries the TXVECTOR parameter CH_BANDWIDTH_IN_NON_HT, the TA field value is a bandwidth signaling TA.

The format of the Sounding Dialog Token field used in HE Sounding procedure, and frames such as HE NDP Announcement and HE Compressed Beamforming Report, is shown in Table I. The Sounding Dialog Token Number subfield in the Sounding Dialog Token field contains a value selected by the beamformer to identify the VHT NDP Announcement frame.

TABLE I

HE Sounding Dialog Token

| Bit positions | Name of subfield | Definition |
|---|---|---|
| B0-B1 | Grouping Set | The subfield Grouping Set is interpreted as follows:<br>If set to 00 it indicates that Sounding Beamforming Report where Ng is chosen from either fine or coarse grouping set is accepted.<br>If set to 01 it indicates that Sounding Beamforming Report where Ng is chosen from coarse grouping set is requested.<br>If set to 10 it indicates that Sounding Beamforming Report where Ng is chosen from fine grouping set is requested.<br>11 is reserved.<br>In some embodiments, HE Sounding Token has the additional field Fine Report Request, B0-B1 have reserved values. |
| B2-B7 | Sounding Dialog Token Number | As described in IEEE 802.11 specification |
| B8-B15 | Fine Report Request (Note that this subfield has the same role as Grouping Set described in below tables) | In some embodiments, HE Sounding Token has additional field (one octet, B8-B15) which is denoted as Fine Report Request. In this embodiment, Fine Report Request field has two sub-fields as follows. The first sub-field is the unit bandwidth of the sub-bands or RUs that sounding reported is requested for (denoted as BW) and could be 2 MHz, 4 MHz, 8 MHz, 10 MHz, or 20 MHz (3 bits is used to indicate BW). The next sub-field is the total number of sub-bands or RUs with the bandwidth of BW that AP seeks fine sounding report for (this sub-field is indicated as NumberRUsFineReport. Note that the bandwidth of BW is the BW sub-field that is indicated in the same Fine Report Request. A STA that receives such Fine Report Request would provide fine sounding report (where Ng is selected from the set of fine grouping set) for at least as many sub-bands or RUs that are is listed in the NumberRUsFineReport sub-field of the Fine Report Request of the previous frame sent by the AP. And for the remaining sub-bands (the sub-bands or RUs that the STA decides not to send fine sounding report) the STA provide coarse sounding report (where Ng is selected from the set of coarse grouping set). In some embodiments, for above-mentioned remaining sub-bands, the STA might report coarse sounding report where Ng is equal to the largest value or one of the largest values of the set of coarse grouping set. |

The format of the Sounding Dialog Token field used in HE Sounding procedure, and frames such as HE NDP Announcement, is shown in Table I. The Sounding Dialog Token Number subfield in the Sounding Dialog Token field contains a value selected by the beamformer to identify the HE NDP Announcement frame. The Sounding Dialog Token field may include additional subfields: Grouping Set. The subfield Grouping Set is interpreted as follows: if set to 00 it indicates that Sounding Beamforming Report where Ng is chosen from either fine or coarse grouping set is accepted; if set to 01 it indicates that Sounding Beamforming Report where Ng is chosen from coarse grouping set is requested; and if set to 10 it indicates that Sounding Beamforming Report where Ng is chosen from fine grouping set is requested. The value of 11 is reserved. The sounding dialog token number is utilized as described in the IEEE 802.11 specification.

In some embodiments, the HE Sounding Token has the additional field Fine Report Request, where B0-B1 may have reserved values to identify the applicability of the additional functionality. In this embodiment, the Fine Report Request field has two sub-fields as follows. The first sub-field is the unit bandwidth (BW) of the sub-bands or the tone size of RUs that sounding reported is requested for and could be 2 MHz, 4 MHz, 8 MHz, 10 MHz, or 20 MHz (3 bits is used to indicate BW), or it could be indicating the unit size of RUs such as 26 tones/RU, 52 tones/RU, 106 tones/RU etc. The next sub-field is the total number of sub-bands or RUs with the bandwidth of BW that the beamformer seeks fine sounding report for (this sub-field is indicated as NumberRUsFineReport. In some embodiments, the value of BW is the BW sub-field that is indicated in the same Fine Report Request. A STA that receives such Fine Report Request would provide fine sounding report (where Ng is selected from the set of fine grouping set) for at least as many sub-bands or RUs that are is listed in the NumberRUsFineReport sub-field of the Fine Report Request of the previous frame sent by the beamformer. And for the remaining sub-bands (the sub-bands or RUs that the STA decides not to send fine sounding report) the STA provide coarse sounding report (where Ng is selected from the set of coarse grouping set). In some embodiments, for above-mentioned remaining sub-bands, the STA might report coarse sounding report where Ng is equal to the largest value or one of the largest values of the set of coarse grouping set, or the STA may provide a single sounding report (e.g. single SNR/SINR value and/or a steering matrix) for each of such RUs, or in some embodiments the STA may provide no sounding report for some of such RUs.

Figure 7:
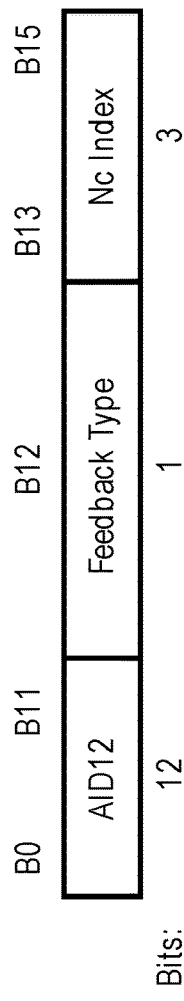
FIG. 7 is a diagram of the format of the STA Info field. The STA info field is used in NDPA (HE or VHT NDPA) frames.

FIG. 7 is a diagram of the format of the STA Info field. The STA info field is used in NDPA (HE or VHT NDPA) frames. The STA Info field includes a 12 bit AID field, a feedback type field and an Nc Index. The feedback type field specifies level of granularity information related to the STA. The Nc Index defines the number of columns in the beamforming feedback.

Figure 8:
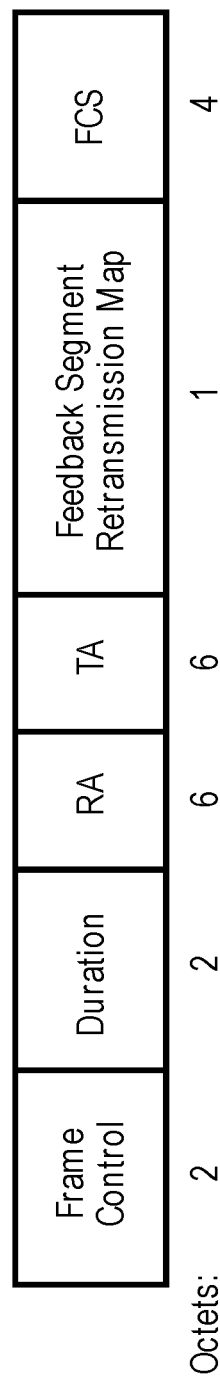
FIG. 8 is a diagram of the Beamforming Report Poll frame.

FIG. 8 is a diagram of the Beamforming Report Poll frame. The fields of the HE Beamforming Report Poll frame are described in Table II.

TABLE II

HE Beamforming Report Poll

| Number of octets | Name of field | Definition and setting |
| --- | --- | --- |
| 2 | Frame Control | As described in IEEE 802.11 specification |
| 3 | Duration | As described in IEEE 802.11 specification |
| 6 | RA | As described in IEEE 802.11 specification |
| 6 | TA | As described in IEEE 802.11 specification |
| 1 | Feedback Segment Retransmission Bitmap | The Feedback Segment Retransmission Bitmap field indicates the requested feedback segments of a VHT Compressed Beamforming report. If the bit in position n (n = 0 for LSB and n = 7 for MSB) is 1 then the feedback segment with the Remaining Feedback Segments subfield in the VHT MIMO Control field equal to n is requested. If the bit in position n is 0 then the feedback segment with the Remaining Feedback Segments subfield in the VHT MIMO Control field equal to n is not requested. |
| 1-TBD | Grouping Set | See below table for Grouping Set (Note in earlier draft the description of Grouping Set appeared in this table) |
| 4 | FCS | As described in IEEE 802.11 specification |

The setting of the common fields in Beamforming Report Poll frame and HE Beamforming Report Poll frame are the same unless otherwise is noted. HE Beamforming Report Poll has Grouping Set subfield. The transmitter address (TA) field value is the address of the STA transmitting the Beamforming Report Poll or a bandwidth signaling TA. In a Beamforming Report Poll frame transmitted by a VHT STA in a non-HT or non-HT duplicate format and where the scrambling sequence carries the TXVECTOR parameter CH_BANDWIDTH_IN_NON_HT, the TA field value is a bandwidth signaling TA. The Feedback Segment Retransmission Bitmap field indicates the requested feedback segments of a VHT Compressed Beamforming report. If the bit in position n (n=0 for LSB and n=7 for MSB) is 1 then the feedback segment with the Remaining Feedback Segments subfield in the VHT MIMO Control field equal to n is requested. If the bit in position n is 0 then the feedback segment with the Remaining Feedback Segments subfield in the VHT MIMO Control field equal to n is not requested.

TABLE III

Grouping Set field (as part of MIMO Control field in HE Compressed Beamforming frame, or as part of HE Beamforming Report Poll)

| Number of octets | Name of field | Definition and setting |
| --- | --- | --- |
| 1-TBD | Grouping Set | In some embodiments, this subfield has length of one octet and takes four values as follows: when this subfield is set to 0 it indicates that coarse grouping set is required, when this subfield is set to 1 it indicates that fine grouping set is required, when this subfield is set to 2 it indicates that fine or coarse grouping set is accepted, when this subfield is set to 3 it indicates that a coarse grouping set is accepted given that the HE Compressed Beamforming Report contains beamforming report for previously unreported tones, In some other embodiments, this subfield has the length of up to four octets, and indicates the required Grouping Set per each 5 MHz sub-band and it is encoded as follows: when bit $B_i$ is set to 0 it indicates that coarse grouping set is required for sub-band i, and if it is set to 1 it indicates that fine grouping set is required, where i = {0, 1, 2, 3} for a 20 MHz PPDU, i = {0, 1, 2, 3, 4, 5, 6, 7} for a 40 MHz PPDU, and i = {0, 1, . . . , 14, 15} for a 80 MHz PPDU, and i = {0, 1, . . . , 31} for 160 MHz and 80 + 80 MHz PPDU. Other bit positions are reserved and set to zero. In some other embodiments, this subfield indicates the required or reported Grouping Set per each BW MHz sub-band. The value of BW could be 2 MHz, 4 MHz, 8 MHz, 10 MHz, or 20 MHz. The value of BW is indicated within the first octet of Grouping Set (in one embodiment, the first three bits of the first octet is used to indicate the value of BW, and the remaining bits of the first octet might be reserved bits, or might be used for the subsequent indications as described |

TABLE III-continued

Grouping Set field (as part of MIMO Control field in HE Compressed Beamforming frame, or as part of HE Beamforming Report Poll)

| Number of octets | Name of field | Definition and setting |
|---|---|---|
| | | below): when bit Bi is set to 0 it indicates that coarse grouping set is required or reported for sub-band i, and if it is set to 1 it indicates that fine grouping set is required or reported, where i = {0, 1, 2, 3, . . . , RU_Max} where RU_Max is the maximum number of resource units for the bandwidth of the NDP PPDU (i.e. 20 MHz, 40 MHz, 80 MHz, 160 MHz, 80 + 80 MHz) and depends on the value of BW. In this embodiment, the length of this sub-field is as follows: for 20 MHz NDPA and NDP frame the length is at most 2 octets, for 20 MHz NDPA and NDP frame the length is 2 octets, for 40 MHz NDPA and NDP frame the length is at most 3 octets, for 80 MHz NDPA and NDP frame the length is at most 5 octets, for 160 MHz and 80 + 80 MHz NDPA and NDP frame the length is at most 9 octets. In some embodiments, the value of BW that appears in the first octet of this subfield indicates the length of the remaining part. Note that in above embodiments, when Grouping Set appears within MIMO Control field in an HE Compressed Beamforming frame then above description is applied to the sounding report that the HE Compressed Beamforming frame carries. And when Grouping Set appears within HE Beamforming Report Poll frame then above description is applied to the sounding report that is being requested. In another embodiment, the Grouping Set has one octet length and has two sub-fields and appears in HE Beamforming Report Poll frame, hence below description is applied to the sounding report that is being requested. The first sub-field is the unit bandwidth of the sub-bands or RUs that sounding reported is requested for (denoted as BW) and could be 2 MHz, 4 MHz, 8 MHz, 10 MHz, or 20 MHz (3 bits is used to indicate BW). The next sub-field is the total number of sub-bands or RUs with the bandwidth of BW that AP seeks fine sounding report for (this sub-field is indicated as NumberRUsFineReport. Note that the bandwidth of BW is the BW sub-field that is indicated in the same Grouping Set. A STA that receives such Grouping Set would provide fine sounding report (where Ng is selected from the set of fine grouping set) for at least as many sub-bands or RUs that are is listed in the NumberRUsFineReport sub-field of the Grouping Set of the previous frame sent by the AP. And for the remaining sub-bands (the sub-bands or RUs that the STA decides not to send fine sounding report) the STA provide coarse sounding report (where Ng is selected from the set of coarse grouping set). In some embodiments, for above-mentioned remaining sub-bands, the STA might report coarse sounding report where Ng is equal to the largest value or one of the largest values of the set of coarse grouping set. |
| 4 | FCS | As described in IEEE 802.11 specification |

The Grouping Set subfield of HE Beamforming Report Poll (as set forth in Table III) has the following interpretation. In some embodiments, this subfield has length of one octet and takes four values as follows: when this subfield is set to 0 it indicates that coarse grouping set is required, when this subfield is set to 1 it indicates that fine grouping set is required, when this subfield is set to 2 it indicates that fine or coarse grouping set is accepted, and when this subfield is set to 3 it indicates that a coarse grouping set is accepted given that the HE Compressed Beamforming Report contains beamforming report for previously unreported tones.

In some other embodiments, this subfield has the length of up to four octets, and indicates the required grouping set per each 5 MHz sub-band and it is encoded as follows: when bit Bi is set to 0 it indicates that coarse grouping set is required for sub-band i, and if it is set to 1 it indicates that fine grouping set is required, where i={0, 1, 2, 3} for a 20 MHz PPDU, i={0, 1, 2, 3, 4, 5, 6, 7} for a 40 MHz PPDU, and i={0, 1, . . . , 14, 15} for a 80 MHz PPDU, and i={0, 1, . . . , 31} for 160 MHz and 80+80 MHz PPDU. Other bit positions are reserved and set to zero.

Figure 9:
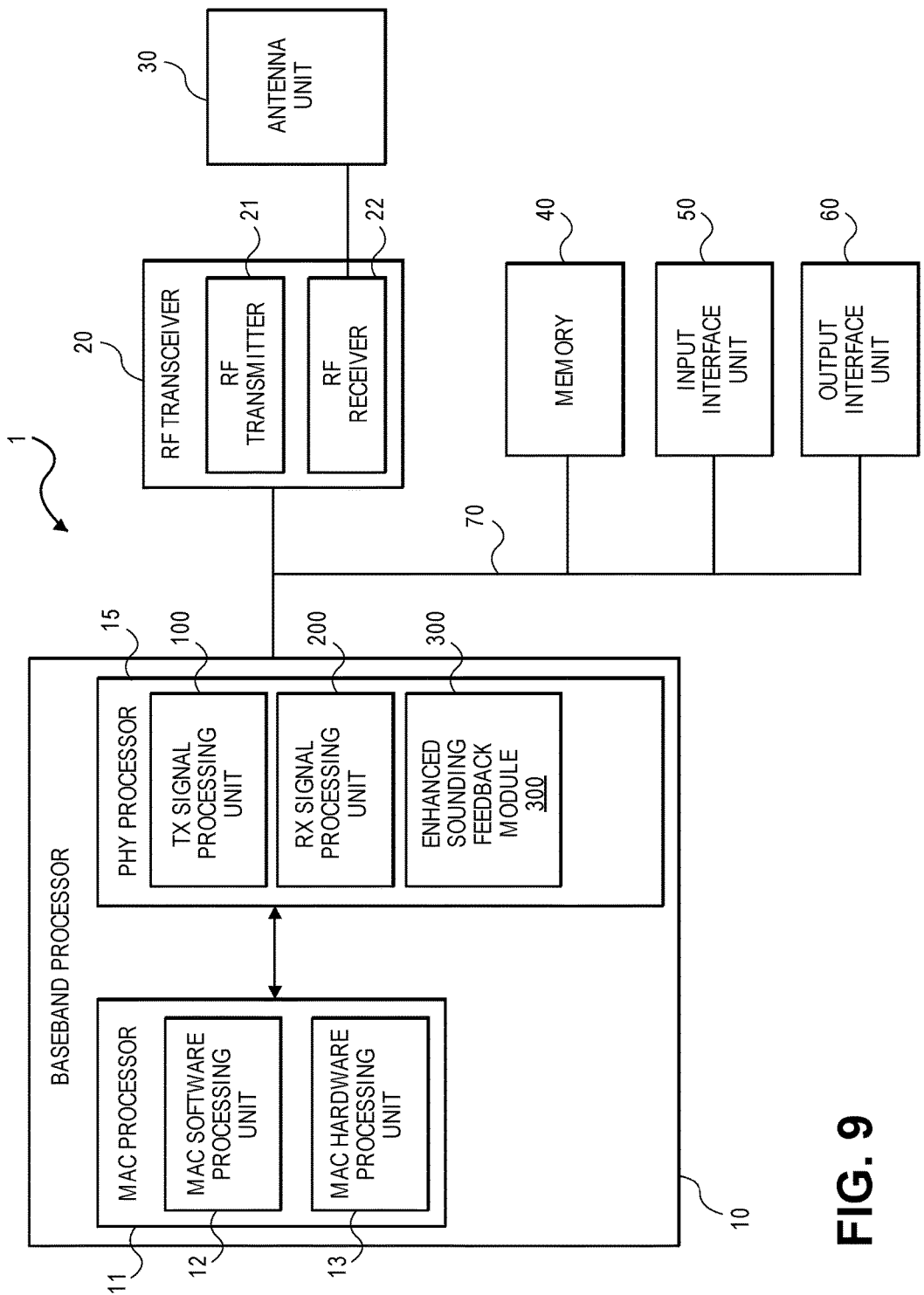
FIG. 9 is a diagram of a network device implementing a station or access point that executes an enhanced sounding feedback module.
Figure 12:
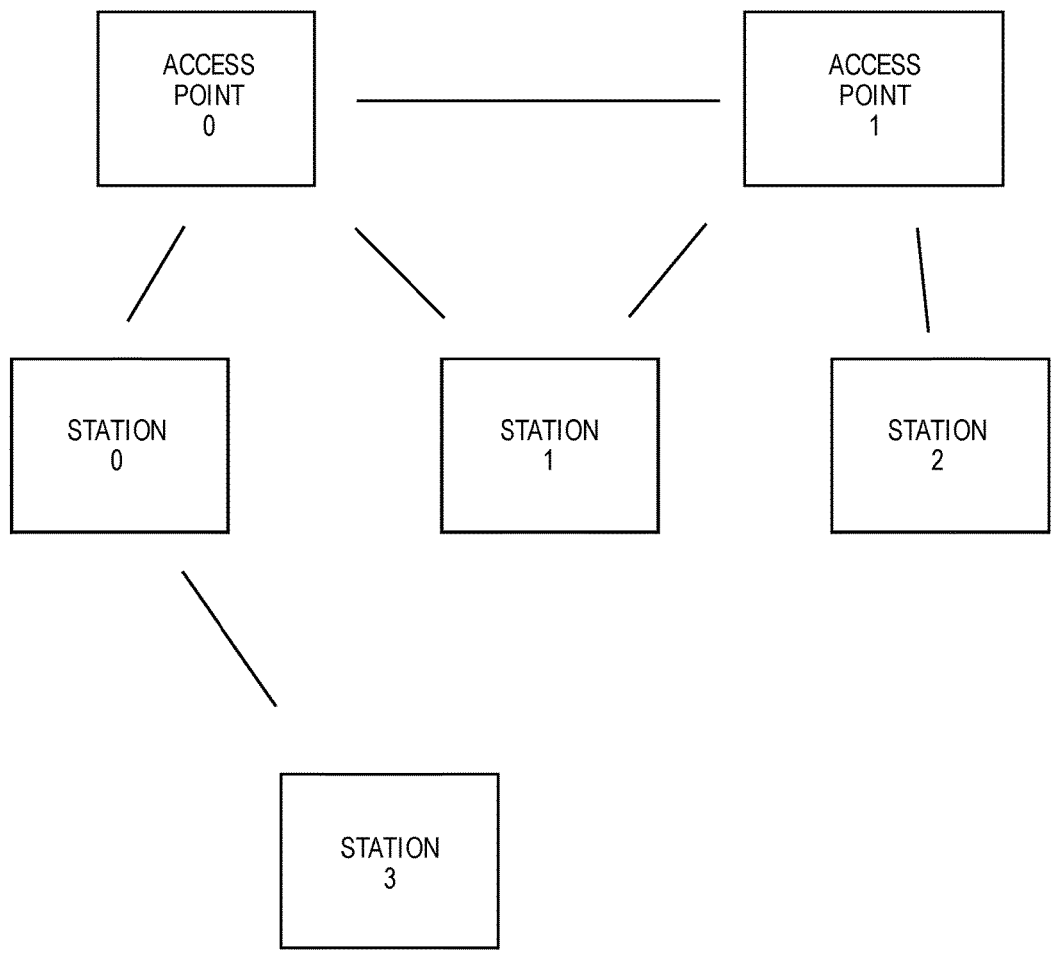
FIG. 12 is a diagram of an example wireless local area network.

FIG. 9 is a diagram of a network device implementing a station or access point that executes an enhanced sounding feedback module. In a wireless local area network (WLAN) such as the example WLAN illustrated in FIG. 12, a basic service set (BSS) includes a plurality of network devices referred to herein as WLAN devices. Each of the WLAN devices may include a medium access control (MAC) layer and a physical (PHY) layer according to IEEE 802.11 standard. In the plurality of WLAN devices, at least one WLAN device may be an access point (AP) station (e.g., access point 0 and access point 1 in FIG. 12) and the other WLAN devices may be non-AP stations (non-AP STAs), (e.g., stations 0-3 in FIG. 12). Alternatively, all of the plurality of WLAN devices may be non-AP STAs in an Ad-hoc networking environment. In general, the AP STA and the non-AP STA may be each referred to herein as a station (STA). However, for ease of description, only the non-AP STA will be referred to herein as a STA whereas the AP stations are referred to herein as APs for ease of description. As shown in FIG. 12, a WLAN can have any combination of stations and access points that can form discrete network, an ad hoc network or any combination thereof. Any number of APs and stations can be included in a WLAN and any topology and configuration of such APs and stations in the network can be utilized.

Referring to FIG. 9, the example WLAN device 1 includes a baseband processor 10, a radio frequency (RF) transceiver 20, an antenna unit 30, memory 40, an input interface unit 50, an output interface unit 60, and a bus 70. The baseband processor 10 performs baseband signal processing, and includes a MAC processor 11 and a PHY processor 15. These processors can be any type of integrated circuit (IC) including a general processing unit or an application specific integrated circuit (ASIC).

In one embodiment, the MAC processor 11 may include a MAC software processing unit 12 and a MAC hardware processing unit 13. The memory 40 may store software (hereinafter referred to as "MAC software"), including at least some functions of the MAC layer. The MAC software processing unit 12 executes the MAC software to implement some functions of the MAC layer and the MAC hardware processing unit 13 may implement the remaining functions of the MAC layer in hardware (hereinafter referred to as "MAC hardware"). However, the MAC processor 11 is not limited to this distribution of functionality.

The PHY processor 15 includes a transmitting signal processing unit 100 and a receiving signal processing unit 200 described further herein below with reference to FIGS. 11 and 12. In some embodiments, the PHY processor 15 can also implement the enhanced sounding feedback module 300 and/or the station set management module 400. The enhanced sounding feedback module 300 and the station set management module 400 can implement the respective functions for any combination of the embodiments described herein above with regard to FIGS. 1-7. In other embodiments, these modules may be implemented by or distributed over both the PHY processor 15 and the MAC processor 11. These modules may be implemented as software or as hardware components of either the PHY processor 15 or MAC processor 11. These modules can be implemented as components of the transmitting signal processing unit 100 and the receiving signal processing unit 200 or as discrete components. In a further embodiment, the enhanced sounding feedback module 300 and/or the station set management module 400 can be implemented by separate components or processors within the baseband processor.

The baseband processor 10, the memory 40, the input interface unit 50, and the output interface unit 60 may communicate with each other via the bus 70. The radio frequency (RF) transceiver 20 includes an RF transmitter 21 and an RF receiver 22. The memory 40 may further store an operating system and applications. In some embodiments, the memory may store the nearby stations set. The input interface unit 50 receives information from a user and the output interface unit 60 outputs information to the user.

The antenna unit 30 includes one or more antennas. When a multiple-input multiple-output (MIMO) or a multi-user MIMO (MU-MIMO) system is used, the antenna unit 30 may include a plurality of antennas.

Figure 10:
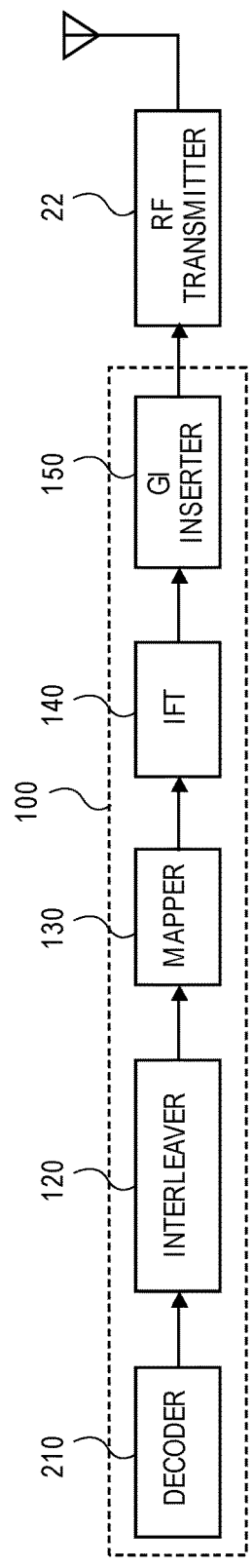
FIG. 10 is a schematic block diagram exemplifying a transmitting signal processor in a WLAN device.

FIG. 10 is a schematic block diagram exemplifying a transmitting signal processor in a WLAN device. Referring to the above drawing, a transmitting signal processing unit 100 includes an encoder 110, an interleaver 120, a mapper 130, an inverse Fourier transformer (IFT) 140, and a guard interval (GI) inserter 150. The encoder 110 encodes input data. For example, the encoder 110 may be a forward error correction (FEC) encoder. The FEC encoder may include a binary convolutional code (BCC) encoder followed by a puncturing device or may include a low-density parity-check (LDPC) encoder.

The transmitting signal processing unit 100 may further include a scrambler for scrambling the input data before encoding to reduce the probability of long sequences of 0s or 1s. If BCC encoding is used in the encoder 110, the transmitting signal processing unit 100 may further include an encoder parser for demultiplexing the scrambled bits among a plurality of BCC encoders. If LDPC encoding is used in the encoder 110, the transmitting signal processing unit 100 may not use the encoder parser.

The interleaver 120 interleaves the bits of each stream output from the encoder to change the order of bits. Interleaving may be applied only when BCC encoding is used. The mapper 130 maps the sequence of bits output from the interleaver to constellation points. If LDPC encoding is used in the encoder 110, the mapper 130 may further perform LDPC tone mapping in addition to constellation mapping.

When multiple input-multiple output (MIMO) or multiple user (MU)-MIMO is used, the transmitting signal processing unit 100 may use a plurality of interleavers 120 and a plurality of mappers 130 corresponding to the number $N_{SS}$ of spatial streams. In this case, the transmitting signal processing unit 100 may further include a stream parser for dividing outputs of the BCC encoders or the LDPC encoder into blocks that are sent to different interleavers 120 or mappers 130. The transmitting signal processing unit 100 may further include a space-time block code (STBC) encoder for spreading the constellation points from the $N_{SS}$ spatial streams into $N_{STS}$ space-time streams and a spatial mapper for mapping the space-time streams to transmit chains. The spatial mapper may use direct mapping, spatial expansion, or beamforming.

The IFT 140 converts a block of the constellation points output from the mapper 130 or the spatial mapper to a time domain block (i.e., a symbol) by using an inverse discrete Fourier transform (IDFT) or an inverse fast Fourier transform (IFFT). If the STBC encoder and the spatial mapper are used, the inverse Fourier transformer 140 may be provided for each transmit chain.

When MIMO or MU-MIMO is used, the transmitting signal processing unit 100 may insert cyclic shift diversities (CSDs) to prevent unintentional beamforming. The CSD insertion may occur before or after the inverse Fourier transform 140. The CSD may be specified per transmit chain or may be specified per space-time stream. Alternatively, the CSD may be applied as a part of the spatial mapper. When MU-MIMO is used, some blocks before the spatial mapper may be provided for each user.

The GI inserter 150 prepends a GI to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When MIMO or MU-MIMO is used, the GI inserter 150 and the RF transmitter 21 may be provided for each transmit chain.

Figure 11:
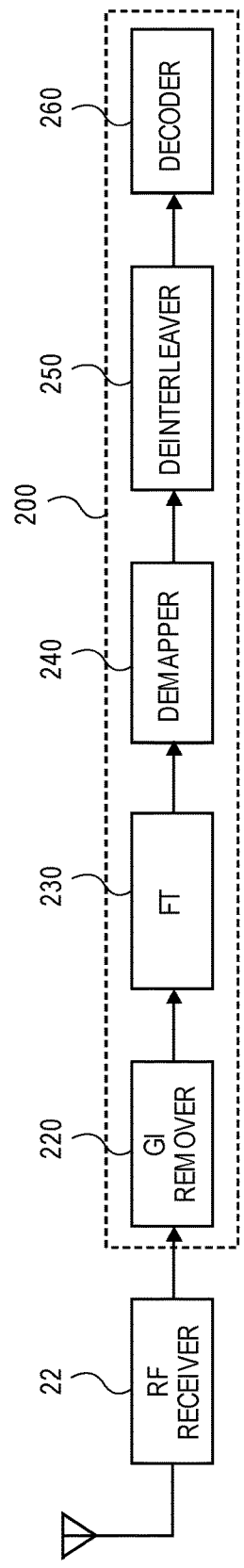
FIG. 11 is a schematic block diagram exemplifying a receiving signal processing unit in the WLAN.

FIG. 11 a schematic block diagram exemplifying a receiving signal processing unit in the WLAN. Referring to FIG. 11, a receiving signal processing unit 200 includes a GI remover 220, a Fourier transformer (FT) 230, a demapper 240, a deinterleaver 250, and a decoder 260.

An RF receiver 22 receives an RF signal via the antenna unit 30 and converts the RF signal into symbols. The GI remover 220 removes the GI from the symbol. When MIMO or MU-MIMO is used, the RF receiver 22 and the GI remover 220 may be provided for each receive chain.

The FT 230 converts the symbol (i.e., the time domain block) into a block of constellation points by using a discrete Fourier transform (DFT) or a fast Fourier transform (FFT). The Fourier transformer 230 may be provided for each receive chain.

When MIMO or MU-MIMO is used, the receiving signal processing unit 200 may use a spatial demapper for converting the Fourier transformed receiver chains to constellation points of the space-time streams and an STBC decoder for despreading the constellation points from the space-time streams into the spatial streams.

The demapper 240 demaps the constellation points output from the Fourier transformer 230 or the STBC decoder to bit streams. If LDPC encoding is used, the demapper 240 may further perform LDPC tone demapping before constellation demapping. The deinterleaver 250 deinterleaves the bits of each stream output from the demapper 240. Deinterleaving may be applied only when BCC encoding is used.

When MIMO or MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining the streams output from the deinterleavers 250.

The decoder 260 decodes the streams output from the deinterleaver 250 or the stream deparser. For example, the decoder 100 may be an FEC decoder. The FEC decoder may include a BCC decoder or an LDPC decoder. The receiving signal processing unit 200 may further include a descrambler for descrambling the decoded data. If BCC decoding is used in the decoder 260, the receiving signal processing unit 200 may further include an encoder deparser for multiplexing the data decoded by a plurality of BCC decoders. If LDPC decoding is used in the decoder 260, the receiving signal processing unit 100 may not use the encoder deparser.

A frame as used herein may refer to a data frame, a control frame, or a management frame may be exchanged between WLAN devices. The data frame is used for transmission of data forwarded to a higher layer. The WLAN device transmits the data frame when the wireless medium is considered to be in an idle condition or state such as after performing backoff if a DIFS has elapsed from a time when the medium was not busy or under similar conditions. The management frame is used for exchanging management information, which is not forwarded to the higher layer. Subtype frames of the management frame include a beacon frame, an association request/response frame, a probe request/response frame, and an authentication request/response frame. The control frame is used for controlling access to the medium. Subtype frames of the control frame include a request to send (RTS) frame, a clear to send (CTS) frame, and an acknowledgement (ACK) frame. In the case that the control frame is not a response frame of the other frame, the WLAN device transmits the control frame after performing backoff if the DIFS has elapsed. In the case that the control frame is the response frame of the other frame, the WLAN device transmits the control frame without performing backoff if a short IFS (SIFS) has elapsed. The type and subtype of frame may be identified by a type field and a subtype field in a frame control field.

On the other hand, a Quality of Service (QoS) STA may transmit the frame after performing backoff if an arbitration IFS (AIFS) for an associated access category (AC), i.e., AIFS[AC] has elapsed. In this case, the data frame, the management frame, or the control frame, which is not the response frame, may use the AIFS[AC].

Clear channel assessment (CCA) is implemented to manage the transmission of frames by the WLAN device. CCA may implement a CSMA (carrier sense multiple access)/CA (collision avoidance) based frame transmission procedure or similar procedure for avoiding collisions between frames in a channel.

Figure 13:
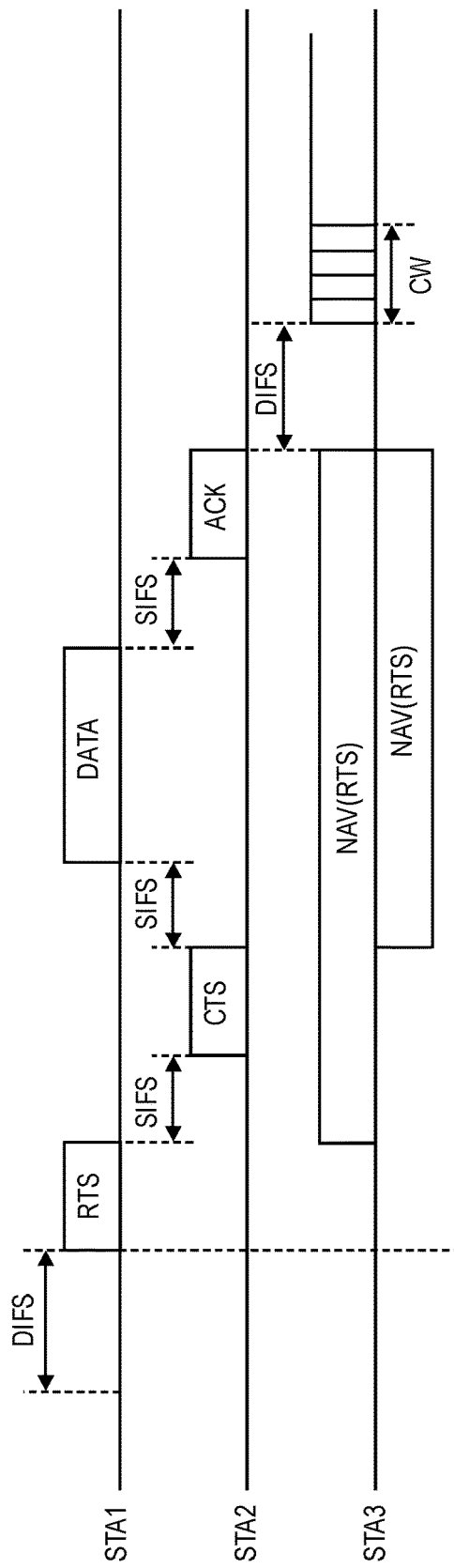
FIG. 13 is a timing diagram providing an example of the carrier sense multiple access/collision avoidance (CSMA/CA) transmission procedure.

FIG. 13 is a timing diagram providing an example of the CSMA/CA transmission procedure. In the illustrated example, STA1 is a transmit WLAN device for transmitting data, STA2 is a receive WLAN device for receiving the data, and STA3 is a WLAN device, which may be located at an area where a frame transmitted from the STA1 and/or a frame transmitted from the STA2 can be received by the WLAN device.

STA1 may determine whether the channel is busy by carrier sensing. The STA1 may determine the channel occupation based on a quality of the signal on the channel or correlation of signals in the channel, or may determine the channel occupation by using a network allocation vector (NAV) timer.

When determining that the channel is not used by other devices during DIFS (that is, the channel is idle), STA1 may transmit an RTS frame to STA2 after performing backoff. Upon receiving the RTS frame, STA2 may transmit a CTS frame as a response of the CTS frame after SIFS. When STA3 receives the RTS frame, it may set the NAV timer for a transmission duration of subsequently transmitted frames (for example, a duration of SIFS+CTS frame duration+ SIFS+data frame duration+SIFS+ACK frame duration) by using duration information included in the RTS frame. When STA3 receives the CTS frame, it may set the NAV timer for a transmission duration of subsequently transmitted frames (for example, a duration of SIFS+data frame duration+ SIFS+ACK frame duration) by using duration information included in the RTS frame. Upon receiving a new frame before the NAV timer expires, STA3 may update the NAV timer by using duration information included in the new frame. STA3 does not attempt to access the channel until the NAV timer expires.

When STA1 receives the CTS frame from the STA2, it may transmit a data frame to the STA2 after SIFS elapses from a time when the CTS frame has been completely received. Upon successfully receiving the data frame, the STA2 may transmit an ACK frame as a response of the data frame after SIFS elapses.

When the NAV timer expires, STA3 may determine whether the channel is busy through the use of carrier sensing techniques. Upon determining that the channel is not used by other devices during DIFS and after the NAV timer has expired, STA3 may attempt channel access after a contention window according to random backoff elapses.

The solutions provided herein have been described with reference to a wireless LAN system; however, it should be understood that these solutions are also applicable to other network environments, such as cellular telecommunication networks, wired networks, and similar communication networks.

An embodiment of the invention may be an article of manufacture in which a non-transitory machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

The PHY entity for IEEE 802.11 implemented in the WLAN device is based on orthogonal frequency division multiple access (OFDM or OFDMA). In either OFDM or OFDMA PHY layers, a STA is capable of transmitting and receiving PPDUs that are compliant with the mandatory PHY specifications. In a PHY specification, set of MCS and maximum number of spatial streams are defined. Also in some PHY entities, downlink and/or uplink MU transmission with a maximum number of space-time streams per user and up to a fix total number of space-time streams is defined.

Figure 14:
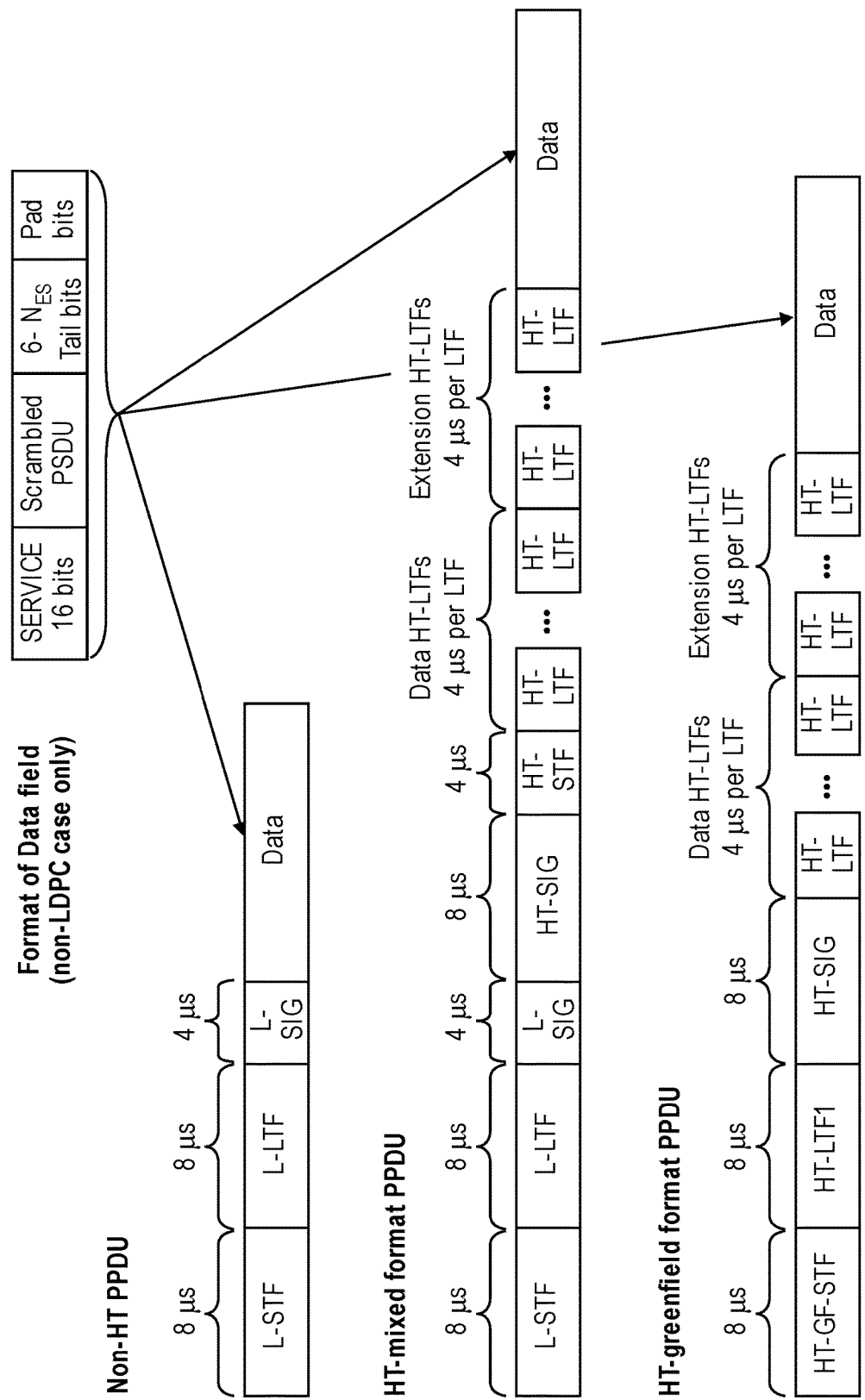
FIG. 14 is a diagram of the different IEEE 802.11n PPDU formats.

While the embodiments relate to enhancements to the sounding procedure for WLANs as may be applicable to IEEE 802.11ax and later technologies, it is relevant to the discussion how several related and preceding technologies function. One such technology is IEEE 801.11n high throughput (HT) defined physical layer convergence protocol (PLCP) protocol data units (PDU) (PPDUs). In particular, the IEEE 802.11n PPDU have several formats. Two formats are defined for the PPDU: HT-mixed format and HT-greenfield format. These two formats are called HT formats. FIG. 14 is a diagram of the different IEEE 802.11n PPDU formats. This diagram shows the non-HT PPDU format and the HT formats. There is also a modulation coding scheme (MCS) 32 format used for MCS 32 that specifies the lowest rate in a 40 MHz channel. In addition to the HT formats, there is a non-HT duplicate format that duplicates the 20 MHz non-HT packet in two 20 MHz halves of a 40 MHz channel.

A FORMAT parameter determines the overall structure of the PPDU. For a non-HT format (NON_HT), the packets of this format are structured according to the Clause 18 (Orthogonal frequency division multiplexing (OFDM) PHY specification) (OFDM) or Clause 19 (Extended Rate PHY (ERP) specification) (ERP) specification. For an HT-mixed format (HT_MF), the packets of this format contain a preamble compatible with orthogonal frequency division multiplexing (OFDM) and extended rate PHY (ERP) receivers. For the non-HT-short training field (STF) (L-STF), the non-HT-long training field (LTF) (L-LTF), and the non-HT SIGNAL field (L-SIG), these fields are defined so they can be decoded by non-HT OFDM PHY and ERP STAs. The rest of the packet cannot be decoded by OFDM PHY or ERP STAs. For the HT-greenfield format (HT_GF), HT packets of this format do not contain a non-HT compatible part. An HT STA that does not support the reception of an HT-greenfield format packet may be able to detect that an HT-greenfield format packet is an HT transmission (as opposed to a non-HT transmission). In this case, the receiver may decode the HT-SIG and determine whether the HT-SIG cyclic redundancy check (CRC) passes.

Another relevant technology is IEEE 802.11ac very high throughput (VHT). Clause 22 of IEEE 802.11ac specifies the PHY entity for a very high throughput (VHT) orthogonal frequency division multiplexing (OFDM) system. In addition to the requirements in Clause 22, a VHT STA may be capable of transmitting and receiving PPDUs that are compliant with the mandatory PHY specifications defined in Clause 20. The VHT PHY is based on the HT PHY defined in Clause 20, which in turn is based on the OFDM PHY defined in Clause 18. The VHT PHY extends the maximum number of space-time streams supported to eight and provides support for downlink multi-user (MU) transmissions. A downlink MU transmission supports up to four users with up to four space-time streams per user with the total number of space-time streams not exceeding eight.

A VHT single-user (SU) PPDU includes individually addressed and group addressed transmissions. The VHT PHY provides support for 20 MHz, 40 MHz, 80 MHz and 160 MHz contiguous channel widths and support for 80+80 MHz non-contiguous channel width. The VHT PHY data subcarriers are modulated using binary phase shift keying (BPSK), quadrature phase shift keying (QPSK), 16-quadrature amplitude modulation (16-QAM), 64-QAM and 256-QAM. Forward error correction (FEC) coding (convolutional or LDPC coding) is used with coding rates of 1/2, 2/3, 3/4 and 5/6.

A VHT STA may be required to support the following features non-HT and non-HT duplicate formats (transmit and receive) for all channel widths supported by the VHT STA, HT-mixed format (transmit and receive), VHT format (transmit and receive), 20 MHz, 40 MHz and 80 MHz channel widths, single spatial stream VHT-MCSs 0 to 7 (transmit and receive) in all supported channel widths, binary convolutional coding.

A VHT STA may optionally support the following features HT-greenfield format (transmit and receive), 2 or more spatial streams (transmit and receive), 400 ns short guard interval (transmit and receive), beamforming sounding (by sending a VHT NDP), responding to transmit beamforming sounding (by providing compressed beamforming feedback), STBC (transmit and receive), LDPC (transmit and receive), VHT MU PPDUs (transmit and receive), support for 160 MHz channel width, support for 80+80 MHz channel width, VHT-MCSs 8 and 9 (transmit and receive).

Figures 15, 16:
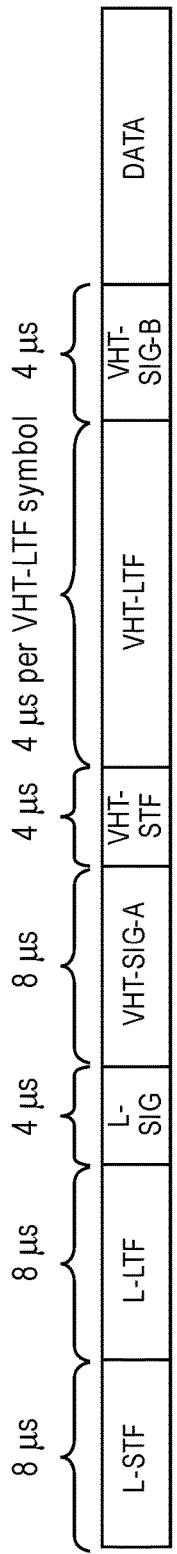
FIG. 15 is a diagram of a very high throughput (VHT) physical layer convergence protocol (PLCP) protocol data unit PPDU utilized by a WLAN device physical layer.
FIG. 16 is a table of the fields of the VHT PPDU.

FIG. 15 is a diagram of a very high throughput (VHT) PPDU utilized by the WLAN device PHY layer. FIG. 16 is a table of the fields of the VHT PPDU. Some PHY entities define PPDU that are individually addressed (where identification is based on AID or Partial AID) and some are group addressed (where identification is based on Group ID, GID). Some PHY entities provide support for 20 MHz, 40 MHz, 80 MHz and 160 MHz contiguous channel widths and support for 80+80 MHz non-contiguous channel width. The data subcarriers are modulated using binary phase shift keying (BPSK), quadrature phase shift keying (QPSK), 16-quadrature amplitude modulation (16-QAM), 64-QAM and 256-QAM. Forward error correction (FEC) coding (convolutional or LDPC coding) is used with coding rates of 1/2, 2/3, 3/4 and 5/6.

In each PHY entity, there would be fields denoted as L-SIG, SGI-A, SIG-B where some crucial information about the PSDU attributes are listed. These symbols are usually encoded with the most robust MCS. The L-SIG, SGI-A, SIG-B have very limited number of bits and it is desired to encode them in the most compact form possible. In a receiving STA, first these symbols are decoded in order to obtain vital information about the PSDU attributes and some MAC attributes. In IEEE 802.11ac, these symbols are called VHT SIG-A and VHT SIG-B symbols.

As discussed above, WLAN devices are currently being deployed in diverse environments. These environments are characterized by the existence of many access points and non-AP stations in geographically limited areas. Increased interference from neighboring devices gives rise to performance degradation. Additionally WLAN devices are increasingly required to support a variety of applications such as video, cloud access, and offloading. In particular video traffic is expected to be the dominant type of traffic in many high efficiency WLAN deployments. With the real-time requirements of some of these applications, WLAN users demand improved performance in delivering their applications, including improved power consumption for battery-operated devices.

IEEE 802.11ax or HE SIG-A and IEEE 802.11ax or HE SIG-B are referred to simply as simply by SIG-A and SIG-B and are amendments to the IEEE 802.11 standard directed at addressing these problems. Unlike previous amendments where the focus was on improving aggregate throughput, this amendment focuses on improving metrics that reflect user experience, such as average per station throughput, the 5th percentile of per station throughput of a group of stations, and area throughput. Improvements will be made to support environments such as wireless corporate office, outdoor hotspot, dense residential apartments, and stadiums.

Some portions of the preceding detailed descriptions have been presented in terms of algorithms and symbolic representations of operations on data bits within a computer memory. These algorithmic descriptions and representations are the ways used by those skilled in conferencing technology to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a conference device, or similar electronic computing device, that manipulates and transforms data represented as physical (electronic) quantities within the conference device's registers and memories into other data similarly represented as physical quantities within the conference device's memories or registers or other such information storage, transmission or display devices.

Note the operations of the flowcharts are described with reference to the exemplary embodiments of the diagrams. However, it should be understood that the operations of flowcharts can be performed by embodiments of the invention other than those discussed, and the embodiments of the diagrams can perform operations different than those discussed with reference to the flowcharts.

While the flowcharts in the figures herein above show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a network device in a wireless local area network (WLAN), the method to improve beamforming where a steering matrix or a compressed beamforming report is utilized by a beamformer using feedback from at least one beamformee, the steering matrix or compressed beamforming report to determine a spatial path for transmission from the beamformer to a set of beamformees in the WLAN, the method comprising:

generating a sounding frame to initiate or continue a sounding procedure, the sounding frame including a level of granularity of feedback for the set of beamformees to report, wherein the level of granularity indicates a set of tone groupings for each beamformee in the set of beamformees to select from;

sending the sounding frame to the set of beamformees; and receiving a compressed beamforming report or a steering matrix from at least one beamformee in the set of beamformees, wherein the compressed beamforming report or the steering matrix includes characteristics for each group of tones in the tone grouping selected by the at least one beamformee for determining the spatial path for transmission from the beamformer to the at least one beamformee.

2. The method of claim 1, wherein the level of granularity indicates a set of tone groupings per each resource unit in a channel on which the sounding procedure is performed.

3. The method of claim 2, wherein the per resource unit set of tone groupings are provided per beamformee such that each beamformee in the set of beamformees selects a tone grouping for each resource unit in the channel.

4. The method of claim 3, wherein the beamforming report includes an indication of the tone groupings that were selected from the set of tone groupings by the at least one beamformee for each resource unit.

5. The method of claim 2, wherein the level of granularity indicated by the sounding frame is one of a set of fine level tone groupings and a set of coarse level tone groupings, wherein the set of fine level tone groupings include smaller tone groups than the set of coarse level tone groupings, wherein the level of granularity further includes an indication of a minimum number of resource units to utilize the set of fine level tone groupings.

6. The method of claim 5, wherein one tone grouping in the set of coarse tone groupings indicates a beamformee is to report a single signal to noise ratio or single signal to noise and interference value for a resource unit.

7. The method of claim 5, wherein one tone grouping in the set of coarse tone groupings indicates a beamformee is to not report a value for a resource unit.

8. The method of claim 1, wherein the level of granularity indicates a set of tone groupings per sub-band on a channel on which the sounding procedure is performed.

9. The method of claim 1, wherein the sounding frame is a null data packet (NDP) announcement frame or High Efficiency (HE) NDP announcement frame.

10. A method implemented by a network device in a wireless local area network (WLAN), the method to improve beamforming where a steering matrix or compressed beamforming report is determined by a beamformer using feedback from at least one beamformee, the steering matrix or compressed beamforming report to determine a spatial path for transmission from the beamformer to a set of beamformees in the WLAN, the method to utilize a level of granularity in reporting feedback between the beamformer and the beamformee for use in determining the steering matrix or compressed beamforming report, the method comprising:

receiving a sounding frame to initiate a sounding procedure from a beamformer, the sounding frame including a level of granularity for use by each beamformee in the set of beamformees when generating a response frame;

accessing the level of granularity in the sounding frame;

selecting a tone grouping from a set of tone groupings indicated by the level of granularity in the sounding frame, wherein each tone grouping in the set of tone groupings indicates which tones in a set of resource units are used to generate feedback data, including one or more of signal to noise ratio, signal interference to noise ratio, and a steering matrix;

generating the response frame based on the level of granularity specified by the sounding frame, wherein the response frame is further generated based on the feedback data; and transmitting the response frame to the beamformer.

11. The method of claim 10, wherein the response frame includes characteristics for each group of tones in the tone grouping selected by the beamformee.

12. The method of claim 11, further comprising:

inserting an indicator of the tone grouping selected by the beamformee in the response frame to assist the beamformer to parse the response frame.

13. The method of claim 12, wherein the indicator in the response frame includes a tone grouping selected per each resource unit in a channel on which the sounding procedure is performed.

14. The method of claim 12, wherein the indicator in the response frame includes a tone grouping selected per subband on a channel on which the sounding procedure is performed.

15. The method of claim 10, wherein the sounding frame is a null data packet announcement (NDPA) or beamforming report poll having a sounding dialog token specifying the level of granularity.

16. The method of claim 10, wherein the level of granularity indicated by the sounding frame is one of a set of fine level tone groupings and a set of coarse level tone groupings, wherein the set of fine level tone groupings include smaller tone groups than the set of coarse level tone groupings, wherein the level of granularity further indicates a minimum number of resource units when the fine level tone groupings are indicated, the method further comprising:

selecting and utilizing a tone grouping from amongst the set of fine level tone groupings for the minimum number of resource units in response to the level of granularity indicating use of the set of fine level tone groupings.

17. The method of claim 16, further comprising:

inserting a single signal to noise ratio or single signal to noise and interference ratio in the response frame for each resource unit for which the set of fine level tone groupings was not utilized.

18. The method of claim 16, further comprising:

inserting an indicator in the response frame that a value is not reported for a resource unit in response to the sounding frame for which the set of fine or set of coarse level tone groupings were not utilized.

19. The method of claim 16, further comprising:

setting a value in the response frame to indicate a number of resource units that where utilized in the set of fine level tone groupings.

* * * * *